United States Patent
Hosaka

(10) Patent No.: US 8,467,088 B2
(45) Date of Patent: Jun. 18, 2013

(54) IMAGE SIGNAL PROCESSING APPARATUS, IMAGING APPARATUS, IMAGE SIGNAL PROCESSING METHOD AND COMPUTER PROGRAM

(75) Inventor: Hajime Hosaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1113 days.

(21) Appl. No.: 11/640,244

(22) Filed: Dec. 18, 2006

(65) Prior Publication Data
US 2007/0153335 A1 Jul. 5, 2007

(30) Foreign Application Priority Data
Dec. 22, 2005 (JP) .................................. 2005-369378

(51) Int. Cl.
*H04N 1/58* (2006.01)
*H04N 9/45* (2006.01)

(52) U.S. Cl.
USPC .......... 358/1.9; 358/3.26; 358/515; 358/512; 382/240; 382/260; 382/255; 396/155

(58) Field of Classification Search
USPC .................................. 358/1.9, 3.26; 382/240
See application file for complete search history.

(56) References Cited

U.S. PATENT DOCUMENTS

| | | | |
|---|---|---|---|
| 2002/0191854 A1* | 12/2002 | Kakarala et al. | 382/240 |
| 2004/0264797 A1* | 12/2004 | Lippincott et al. | 382/260 |
| 2006/0093234 A1* | 5/2006 | Silverstein | 382/255 |
| 2007/0127908 A1* | 6/2007 | Oon et al. | 396/155 |

FOREIGN PATENT DOCUMENTS
JP 2003102021 A * 4/2003

OTHER PUBLICATIONS
Georg Petschnigg et al., "Digital Photography with Flash and No-Flash Image Pairs", ACM Transaction on Graphics, vol. 23, No. 3, pp. 664-672, Aug. 2004.

* cited by examiner

*Primary Examiner* — Steven Kau
*Assistant Examiner* — Quang N Vo
(74) *Attorney, Agent, or Firm* — Finnegan, Henderson, Farabow, Garrett & Dunner LLP

(57) ABSTRACT

There is provided an image signal processing apparatus, comprising a demosaic processing unit receiving input of mosaic image data of each of signals obtained by a single plate imaging device having an element array composed of visible light obtaining elements obtaining visible light signals, and invisible light obtaining elements obtaining signals including invisible light components, and generating a demosaic image of each of the obtained signals; and a noise reduction processing unit receiving input of the demosaic image to execute correction of pixel values of the demosaic image obtained by the visible light obtaining elements on the basis of edge information extracted from the demosaic image of the signals obtained by the invisible light obtaining elements.

17 Claims, 16 Drawing Sheets

F I G . 1

| G | B | G | B |
| R | G | R | G |
| G | B | G | B |
| R | G | R | G |

RELATED ART

FIG. 6

| G | A | G | A |
|---|---|---|---|
| A | B | A | R |
| G | A | G | A |
| A | R | A | B |

FIG. 8A
MOSAIC IMAGE

FIG. 8B
DEMOSAIC IMAGE

FIG. 13

| -1 | -2 | -3 | -2 | -1 |
|---|---|---|---|---|
| -2 | 3 | 4 | 3 | -2 |
| -3 | 4 | 4 | 4 | -3 |
| -2 | 3 | 4 | 3 | -2 |
| -1 | -2 | -3 | -2 | -1 |

IMAGE SIGNAL PROCESSING APPARATUS, IMAGING APPARATUS, IMAGE SIGNAL PROCESSING METHOD AND COMPUTER PROGRAM

BACKGROUND OF THE INVENTION

1. Field of the Invention

The present invention relates to an image signal processing apparatus, an imaging apparatus, an image signal processing method and a computer program, and more particularly to an image signal processing apparatus, an imaging apparatus, an image signal processing method and a computer program for performing signal processing of imaged data by a solid state imaging device of a single plate color system.

2. Description of Related Art

A general solid state imaging device of the single plate color system has a color filter stuck thereto to transmit a specific wavelength component in each pixel to a surface of an imaging device, and restores necessary color components by a set of a plurality of pixels. At this time, for example, a Bayer color array that expresses red (R), green (G) and blue (B) by a set of four pixels as shown in FIG. 1 or the like is used as the color array used for the color filter. Because each pixel has only the information of a single color component like this in the solid state imaging device of the single plate color system, demosaic processing that restores necessary color components in each pixel by performing interpolation processing using the color information of surrounding pixels is performed.

The configuration of an imaging apparatus equipped with a solid state imaging device of the single plate color system is shown in FIG. 2. A solid state imaging device 13 of the single plate color system receives the light that transmits a color filter 12 among the incident light through an optical lens 11. An image signal that is photoelectrically converted by the solid state imaging device 13 to be output as an electric signal is converted into a digital signal by a not shown A/D converter. After that, the converted image signal receives clipping processing, gamma correction, white balance correction, demosaic processing and the like in a camera signal processing unit 14, and the processed signal is transmitted to an image compressing unit 15. The image compressing unit 15 reduces the amount of data of the image signal, and converts the reduced image signal into a predetermined recording image format to output the converted image signal. A recording unit 16 records the converted image data on a recording medium. Hereupon, it is not always necessary to perform the image compressing processing, the image compression is ordinarily performed because the number of pixels of an imaging device has increased in recent years and the miniaturization of an apparatus itself has been required.

With reference to FIG. 3, the demosaic processing of an image obtained by the solid state imaging device of a single plate color system is described. The solid state imaging device of a single plate color system is configured to perform imaging through a color filter having a color array such as the Bayer color array of the primary color system (see FIG. 1) or the like, and is configured to obtain only the signals having a specific wavelength to each pixel, i.e., the color component data of a specific wavelength. In a case of using the solid state imaging device of the single plate color system having the Bayer color array, an output image 20 of the solid state imaging device becomes a color mosaic image having only one piece of information of R, G and B at each pixel.

A demosaic processing unit 21 executes the processing of restoring all pieces of information of each color component data, i.e., R, G and B, by performing color interpolation processing to each pixel.

First, the restoration of a G signal which restoration is executed by the demosaic processing unit 21 is described. In the Bayer color array, the G signal is obtained in a checkered pattern. At a pixel at which no G signal exists in the output image 20 of the solid state imaging device, for example, a case of $G_{11}$, the G signal is generated by interpolation processing based on surrounding G signals. To put it concretely, the G signal ($G_{11}$) is restored in accordance with the following expression.

$$G_{11}=(1/4)(G_{01}+G_{21}+G_{10}+G_{12})$$

Next, the restorations of an R signal and a B signal are described. In the Bayer color array, the data of both of the R and B exist every other pixel line. For example, R signals exist but no B signals exist in the pixel line of the top rung of the output image 20 of the solid state imaging device shown in FIG. 3. Moreover, B signals exist but no R signals exist in the second pixel line.

In a pixel line in which either data R or data B exists, the data R or the data B is obtained every other pixel. In the case where an R signal (B signal) exists in the same line as that of a pixel at which a certain R signal (B signal) does not exist in the output image 20 of the solid state imaging device, for example, cases of $R_{01}$ and $B_{12}$, interpolated pixel values in the pixels in which the R and B signals do not exist on the pixel line can be calculated by the following expressions, and the R signal (B signal) of each pixel can be restored.

$$R_{01}=(1/2)(R_{00}+R_{02})$$

$$B_{12}=(1/2)(B_{11}+B_{13})$$

In the case where R signals (B signals) exist in the same column, for example, cases of $R_{10}$ and $B_{21}$, the interpolated pixel values at the pixels where certain R and B signals do not exist can be similarly calculated in accordance with the following expressions, and the R signal (B signal) in each pixel is restored.

$$R_{10}=(1/2)(R_{00}+R_{20})$$

$$B_{21}=(1/2)(B_{11}+B_{31})$$

Moreover, in a case where no R signals (B signals) exist in both of the same line and the same column, for example, cases of $R_{11}$ and $B_{22}$, the interpolated pixel values in the pixels in which certain R and B signals exist can be calculated by the following expressions, and the R signal (B signal) at each pixel is restored.

$$R_{11}=(1/4)(R_{00}+R_{02}+R_{20}+R_{22})$$

$$B_{22}=(1/4)(B_{11}+B_{13}+B_{31}+B_{33})$$

The demosaic processing unit 21 performs the color interpolation processing as mentioned above, and outputs R signals 22r, G signals 22g and B signals 22b to all pixels. It is noted that the above interpolation processing is only one example, and any color interpolation processing using the correlations with the other color signals may be performed.

Various image processing methods for reducing noise to improve the image quality of an imaging apparatus equipped with a solid state imaging device of a single plate color system have been proposed. For example, Georg Petschnigg Et al, "Digital Photography with Flash and No-Flash Image pairs," acm Transaction on Graphics, Vol. 23, Number 3, pp. 664-672, August 2004 (a non-patent document 1) discloses a technique of photographing a plurality of images having different spectral characteristics one after another and utilizing the plurality of images having the different spectral characteristics to obtain an image in which noise is reduced. That is, the technique photographs the following two kinds of images sequentially:

(a) images that have been photographed with spectral characteristics near to a target and include much noise, and (b) images that have been photographed with spectral characteristics that severally include an invisible light or a different color not to be near to the target and include little noise. Then, the technique utilizes the images having the plurality of different spectral characteristics to obtain an image having a correct color and little noise.

A configuration of noise reduction processing using a solid state imaging device of a single plate color system using the algorithm shown by the related art technique is described with reference to FIG. 4. The imaging device 30 is an imaging device of the Bayer color array of a general RGB array, which has been described above with reference to FIG. 1.

A plurality of images A and B is photographed using the imaging device 30, changing light sources. That is, the images A and B are as follows:

(the image A) an image that has been photographed with a spectral characteristic near to a target and include much noise, and (the image B) an image that has been photographed with a spectral characteristic that includes an invisible light or a different color not to be near to the target and includes little noise.

The two mosaic images A and B are obtained by the photographing processing. The mosaic image A is dark and has much noise, but the color of which is correct. The mosaic image B is bright and includes little noise, but the color of which is incorrect. Two images of a high noise image A and a low noise image B are obtained by applying white balance processing of correcting pixel values to each spectrum to the photographed images A and B in white balance processing units 31a and 31b, respectively, and by executing demosaic processing to the images having been subjected to the white balance processing that has been described with reference to FIG. 3 in demosaic processing units 32a and 32b, respectively.

Moreover, the two images of the high noise image A and the low noise image B are input into a noise reduction processing unit 33, and the noise reduction processing based on these two images is executed. Then, an output RGB image is obtained.

The configuration and the processing of the noise reduction processing unit 33 are described with reference to FIG. 5. The noise reduction processing unit 33 uses the two images of the high noise image A and the low noise image B to produce the output RGB image, which has a color equal to the high noise image A with reduced noise by synthesizing these images.

An RGB low pass filter 42 is a cross bilateral filter, which is a kind of an edge preserving filter, and reduces the noise of the high noise image A with the edges of the image A, which has much noise, being preserved on the basis of the edges detected from the respective R, G and B components of the low noise image B as an input image.

An RGB low pass filter 41 applies a general FIR low pass filter, which is not especially equipped with any edge preserving functions, to each channel of R, G and B. An RGB high pass filter 45 obtains the high frequency component of each pixel value of R, G and B of the low noise image B, which is an input image having little noise. The acquisition of the high frequency components is performed by dividing the pixel values as the result of the application of the bilateral filter to the input images by the pixel values of the images before the application of the filter.

A blend executing unit 44 applies a previously set blend function to generate the image data having the pixel values obtained by multiplying the pixel values of an output image of the RGB low pass filter 42 by the pixel values of an output image of the RGB high pass filter 45, and to output the generated image data.

A speculum detecting unit 43 extracts the differences of the highlight, the shadow and the like in each pixel of the high noise image A and the low noise image B owing to the illumination change between the two images, and evaluates the height of the possibility of the occurrence of the differences of pixel values owing to the illumination change. A blend executing unit 46 performs the weighted addition of an output of the RGB low pass filter 41 and an output of the blend executing unit 44 on the basis of an evaluation result of the speculum detecting unit 43 to generate the output RGB image.

The blend executing unit 46 performs the setting of enlarging the weight of the pixel values output from the RGB low pass filter 41 in a pixel portion to which the speculum detecting unit 43 has judged that the possibility of the occurrence of the shadow or the highlight owing to the illumination change is high, and enlarging the weight of the pixel values output from the blend executing unit 44 in a pixel portion to which the speculum detecting unit 43 has judged that the possibility of the occurrence of the shadow or the highlight owing to the illumination change is low by regarding the pixel portion as the appearance of the detailed parts of a subject owing to the difference of illuminations. Thereby, the blend executing unit 46 performs the weighted addition of the output of the RGB low pass filter 41 and the output of the blend executing unit 44 to generate the output RGB image.

However, the algorithm is realized on the assumption that a plurality of images is photographed with different spectra, and consequently has a problem of the impossibility of applying the algorithm to a general digital camera and a movie camera, which can photograph an image only once at the same instant.

SUMMARY OF THE INVENTION

Consequently, there are a need to provide an image processing method for reducing noise to improve image quality of an image in an imaging apparatus equipped with a solid state imaging device of the single plate color system, and a need to provide an image signal processing apparatus, an imaging apparatus, an image signal processing method and a computer program all of which can exclude the necessity of inputting a plurality of images to reduce noise on the basis of a photographed image and make it possible to obtain an output image having an improved image quality.

Moreover, there is also a need to provide an image signal processing apparatus, an imaging apparatus, an image signal processing method and a computer program all of which make it possible to realize noise reduction processing based on only a once photographed image by using an imaging device (imager) that is set to have spectrum in an invisible light region in a part of a solid state imaging device of the single plate color system, and which can be applied to a general digital still camera, a general video camera and the like.

A first aspect of the present invention is an image signal processing apparatus, including a demosaic processing unit and a noise reduction processing unit. The demosaic processing unit receives input of mosaic image data of each of signals obtained by a single plate imager having an element array composed of visible light obtaining elements obtaining visible light signals, and invisible light obtaining elements obtaining signals including invisible light components, and generates a demosaic image of each of the obtained signals. The noise reduction processing unit receives input of the demosaic image to execute correction of pixel values of the demosaic image obtained by the visible light obtaining elements on the basis of edge information extracted from the demosaic image of the signals obtained by the invisible light obtaining elements.

Moreover, in an embodiment of the image signal processing apparatus of the present invention, the visible light obtaining elements are RGB elements obtaining R, G and B color signals severally, and the invisible light obtaining elements are A elements obtaining A signals including R, G and B color signal components and infrared components. Furthermore, the demosaic processing unit is configured to receive input of mosaic image data of each of the R, G, B and A signals obtained by the single plate imager having a color array composed of the RGB elements obtaining the R, G and B color signals severally, and the A elements obtaining the A signal including the R, G and B color signal components and the infrared components, and to generate the demosaic image of each of the R, G, B and A signals. The noise reduction processing unit is configured to receive input of the demosaic image of each of the R, G, B and A signals, and to execute the correction of the pixel values of the RGB demosaic image based on the edge information extracted from the demosaic image of the A signal.

Moreover, in an embodiment of the image signal processing apparatus of the present invention, the noise reduction processing unit is configured to execute processing of correcting the pixel values of the pixels constituting the RGB demosaic image on the basis of pixel values of surrounding pixels according to edge distribution near the pixels.

Moreover, in an embodiment of the image signal processing apparatus of the present invention, the image signal processing apparatus is configured such that the second demosaic processing unit generates an edge evaluating image as the demosaic image of the A signal, and the noise reduction processing unit executes the demosaic processing of the mosaic image of each of the R, G and B signals by collectively executing noise reduction and demosaic processing by executing the demosaic processing in consideration of edge positions based on the edge evaluating image as the demosaic image of the A signal.

Moreover, in an embodiment of the image signal processing apparatus of the present invention, the noise reduction processing unit is configured to execute processing of calculating an output pixel value [Out (x, y)] of each pixel position (x, y) in the RGB mosaic image on the basis of the pixel values of the surrounding pixels by applying weight [W] calculated by a product of space-dependent weight [Ws] dependent upon a distance between a pixel of a correction object and a reference pixel and edge-dependent weight [Wr] dependent upon strength of an edge of an image calculated in conformity to the edge evaluating image as the demosaic image of the A signal at a time of the demosaic processing of the mosaic images of each of the R, G and B signals.

Moreover, in an embodiment of the image signal processing apparatus of the present invention, the image signal processing apparatus further includes an A-noise reduction processing unit and a matrix operation executing unit. The A-noise reduction processing unit generates a noise-reduced A demosaic image corresponding to the A signal on the basis of the edge information extracted from the demosaic image of the A signal. The matrix operation executing unit receives input of the noise-reduced RGB demosaic image generated by the noise reduction processing unit and the noise-reduced A demosaic image, and converts pixel values of corresponding pixels of input four demosaic images of R, G, B and A by a matrix operation to generate the RGB image in which the infrared components are removed form the R, G and B signals.

Moreover, in an embodiment of the image signal processing apparatus of the present invention, the matrix operation executing unit is configured to generate and output an estimated infrared image composed of infrared components on the basis of the noise-reduced RGB demosaic image generated by the noise reduction processing unit and the noise-reduced A demosaic image.

Moreover, a second aspect of the present invention is an imaging apparatus which includes an imager, a demosaic processing unit and a noise reduction processing unit. The imager has a color array composed of RGB elements obtaining R, G and B color signals severally and A elements obtaining A signals including R, G and B color signal components and infrared components. The demosaic processing unit receives input of mosaic image data of each of the R, G, B and A signals obtained by the single plate imager to generate a demosaic image of the R, G, B and A signals. The noise reduction processing unit receives the input of the demosaic image of the R, G, B and A signals to correct pixel values of the RGB demosaic image on the basis of edge information extracted from the demosaic image of the A signal.

Moreover, in an embodiment of the imaging apparatus of the present invention, the imager is configured to have a checker-pattern arrangement of the A elements obtaining the A signals.

Moreover, a third aspect of the present invention is an image signal processing method including a demosaic processing step and a noise reduction processing step. The demosaic processing step is a step of receiving input of mosaic image data of each of signals obtained by a single plate imager having an element array composed of visible light obtaining elements obtaining visible light signals and invisible light obtaining elements obtaining signals including invisible light components to generate a demosaic image of each of the obtained signals. The noise reduction processing step is a step of receiving input of the demosaic image to execute a correction of pixel values of the demosaic image obtained by the visible light obtaining elements based on edge information extracted from the demosaic image of the signals obtained by the invisible light obtaining elements.

Moreover, in an embodiment of the image signal processing method of the present invention, the visible light obtaining elements are RGB elements obtaining R, G and B color signals severally, the invisible light obtaining elements are A elements obtaining A signals including R, G and B color signal components and infrared components, the demosaic processing step is a step of receiving the input of the mosaic image data of each of the R, G, B and A signals obtained by the single plate imager having a color array composed of the RGB elements obtaining the R, G and B color signals severally, and the A elements obtaining the A signals including the R, G and B color signal components and the infrared components, and generating the demosaic image of each of the R, G, B and A signals, and the noise reduction processing step is a step of receiving the input of the demosaic image of each of the R, G, B and A signals, and executing the correction of the pixel values of the RGB demosaic image based on the edge information extracted from the demosaic image of the A signals.

Moreover, in an embodiment of the image signal processing method of the present invention, the noise reduction processing step is a step of executing processing of correcting the pixel values of the pixels constituting the RGB demosaic image on the basis of pixel values of surrounding pixels according to edge distribution near the pixels on the basis of the edge information detected from the demosaic image of the A signals.

Moreover, in an embodiment of the image signal processing method of the present invention, in the image signal processing method, the demosaic processing step is a step of generating an edge evaluating image as the demosaic image of the A signals, and the noise reduction processing step is a step of executing the demosaic processing of the mosaic image of each of the R, G and B signals by collectively executing noise reduction and demosaic processing by executing the demosaic processing in consideration of edge positions based on the edge evaluating image as the demosaic image of the A signals.

Moreover, in an embodiment of the image signal processing method of the present invention, the noise reduction processing step is a step of executing processing of calculating an output pixel value [Out (x, y)] of each pixel position (x, y) in the RGB demosaic image based on the pixel values of the surrounding pixels by applying weight [W] calculated by a product of space-dependent weight [Ws] dependent upon a distance between a pixel of a correction object and a reference pixel and edge-dependent weight dependent upon strength of an edge of an image calculated [Wr] in conformity to the edge evaluating image as the demosaic image of the A signals at a time of the demosaic processing of the mosaic images of each of the R, G and B signals.

Moreover, in an embodiment of the image signal processing method of the present invention, the image signal processing method further includes an A-noise reduction processing step and a matrix operation executing step. The A-noise reduction processing step is a step of generating a noise-reduced A demosaic image corresponding to the A signals on the basis of the edge information extracted from the demosaic image of the A signals. The matrix operation executing step is a step of receiving input of the noise-reduced RGB demosaic image generated at the step of receiving the input of the demosaic image and the noise-reduced A demosaic image, and converting pixel values of corresponding pixels of input four demosaic images of R, G, B and A by a matrix operation to generate the RGB image in which the infrared components are removed from the R, G and B signals.

Moreover, in an embodiment of the image signal processing method of the present invention, the matrix operation executing step is a step of generating and outputting an estimated infrared image composed of the infrared components based on the noise-reduced RGB demosaic image generated at the step of receiving the input of the demosaic image and the noise-reduced A demosaic image.

Moreover, a fourth aspect of the present invention is a computer program for making an imaging apparatus execute image signal processing, the program making the apparatus execute a demosaic processing step and a noise reduction processing step. The demosaic processing step is a step of receiving input of mosaic image data of each of signals obtained by a single plate imager having an element array composed of visible light obtaining elements obtaining visible light signals and invisible light obtaining elements obtaining signals including invisible light components to generate a demosaic image of each of the obtained signal. The noise reduction processing step is a step of receiving input of the demosaic image to execute a correction of pixel values of the demosaic image obtained by the visible light obtaining elements on the basis of edge information extracted from the demosaic image obtained by the invisible light obtaining elements.

It is noted that the computer program of the present invention is a computer program capable of being provided by a storage medium such as a CD, an FD, an MO and the like, and a communication medium such as a network and the like, which are provided in a computer-readable form to, for example, a general purpose computer capable of executing various program codes. By providing such a program in the computer-readable form, the processing corresponding to the program can be realized on the computer system.

Further features and advantages of the present invention will become apparent from the following description of exemplary embodiments of the present invention with reference to the attached drawings. In addition, a system in the present specification means the configuration of a logical set of a plurality of apparatus, and is not limited to the one in which the apparatus of each configuration is located in the same housing.

BRIEF DESCRIPTION OF THE DRAWINGS

FIG. 1 is a diagram for describing an example of the Bayer color array as a color array used for a general color filter;

FIG. 6 is a diagram for describing the color array of an imager to which the present invention is applied;

FIGS. 8A and 8B are diagrams for describing a mosaic image and a demosaic image that are generated in the processing of the present invention;

FIG. 13 is a diagram for describing the factors of a FIT high pass filter in the image signal processing configuration (the second processing example) according to the embodiment of the present invention;

DETAILED DESCRIPTION OF THE EMBODIMENTS

In the following, a description will be given to an image signal processing apparatus, an imaging apparatus, an image signal processing method and a computer program of the present invention with reference to the attached drawings. The description will be performed in the following order:
1. configuration of imager
2. first image signal processing example
3. second image signal processing example
4. third image signal processing example
5. fourth image signal processing example

[1. Configuration of Imager]

Figure 1:
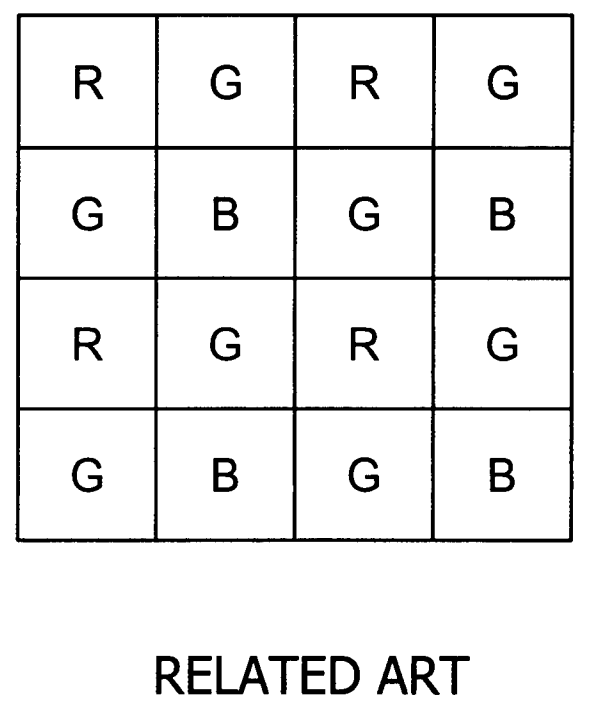
Figure 2:
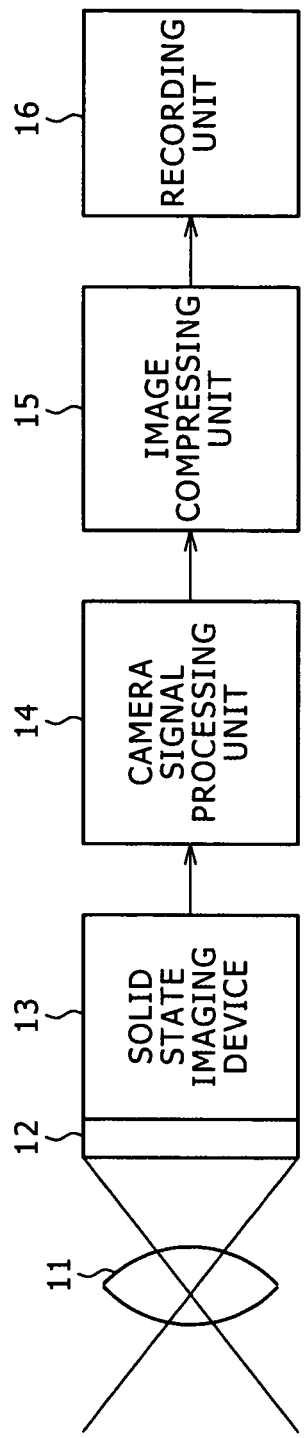
FIG. 2 is a diagram showing a configuration of an imaging apparatus equipped with a solid state imager of a single plate color system.

First, a description will be given to the configuration of an imaging device (hereinafter, referred to as imager) applied to an imaging apparatus of the present invention. The imaging apparatus of the present invention has a configuration that is basically similar to the one described above with reference to FIG. 2, but the imager applied to the imaging apparatus has a configuration different from the Bayer color array described with reference to FIG. 1. The configuration of the imager applied to the imaging apparatus of the present invention is described with reference to FIG. 6. The general solid state imager of the single plate color system has been described above with reference to FIG. 1. The general solid state imager of the single plate color system has stuck thereto a color filter transmitting only a specific wavelength component in each pixel to the surface of the imager, and restores necessary color components by a set of a plurality of pixels. In this case, the Bayer color array expressing red (R), green (G) and blue (B) by means of a set of four pixels as shown in FIG. 1, for example, is used as the color array used in the color filter.

Figure 6:
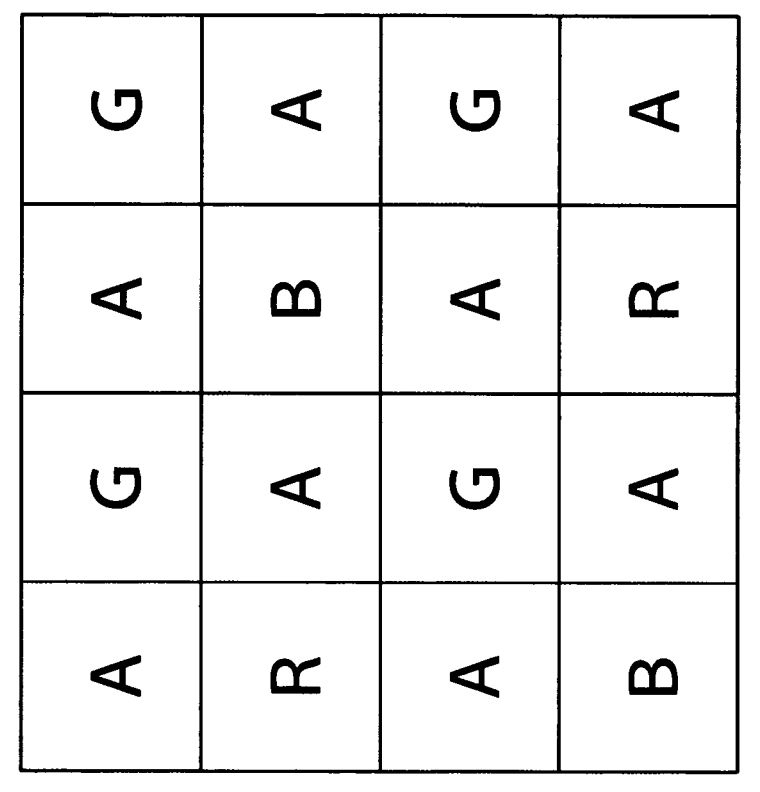

The imager applied to the imaging apparatus of the present invention includes a color array shown in FIG. 6. That is, the imager is composed of a color filter including the following four kinds of spectral characteristics: red (R) transmitting the wavelengths near a red color, green (G) transmitting the wavelengths near a green color, blue (B) transmitting the wavelengths near a blue color, and A transmitting all of the infrared rays (IR), R, G and B in addition to the former three colors. The four kinds of spectra are composed of an R channel, a G channel, a B channel and an A channel transmitting all of the infrared rays (IR), the R, the G and the B, and a mosaic image composed of the four kinds of spectra can be obtained by means of the imager.

The imager applied to the imaging apparatus of the present invention is a single plate imager including a color array composed of RGB elements that severally obtain R, G and B color signals, and A-elements that obtain A-signals including R, G and B color signal components and infrared components, as shown in FIG. 6. The A-signal obtaining elements are arranged in a checkered pattern. The imaging apparatus of the present invention executes signal processing such as the noise reduction processing, the infrared light removing processing and the like of data of an image photographed by applying the imager shown in FIG. 6 to obtain a high quality image.

[2. First Image Signal Processing Example]

Next, a first specific example of the noise reduction processing of the data of the image photographed by the application of the imager shown in FIG. 6 is described with reference to FIG. 7 and so forth. The present processing example is a processing example of executing the noise reduction processing of an image including much noise, such as an image photographed at a low illumination, on the basis of the data of the image photographed by applying the imaging device (imager) shown in FIG. 6.

Figure 7:
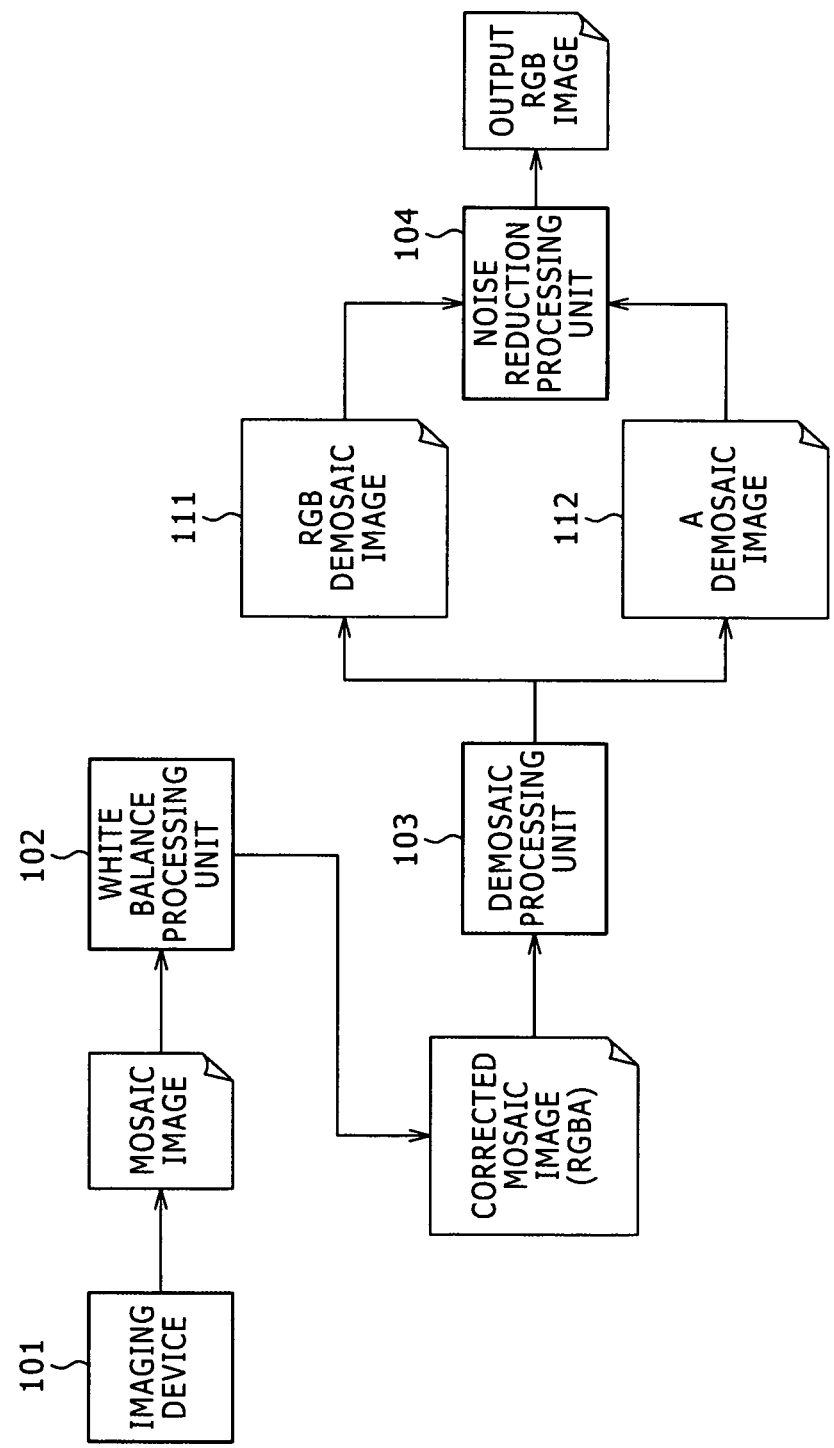
FIG. 7 is a diagram describing an image signal processing configuration (a first processing example) according to an embodiment of the present invention.

FIG. 7 shows the image signal processing configuration of an imaging apparatus according to a first embodiment of the present invention. An imager 101 is the imager of R, G, B and A described with reference to FIG. 6, and includes a filter having a spectral characteristic of the four kinds of colors of R, G, B and A. The four kinds of spectra are composed of the R channel, the G channel, the B channel and the A channel transmitting all of infrared rays (IR), R, G and B.

Figures 8A, 8B:
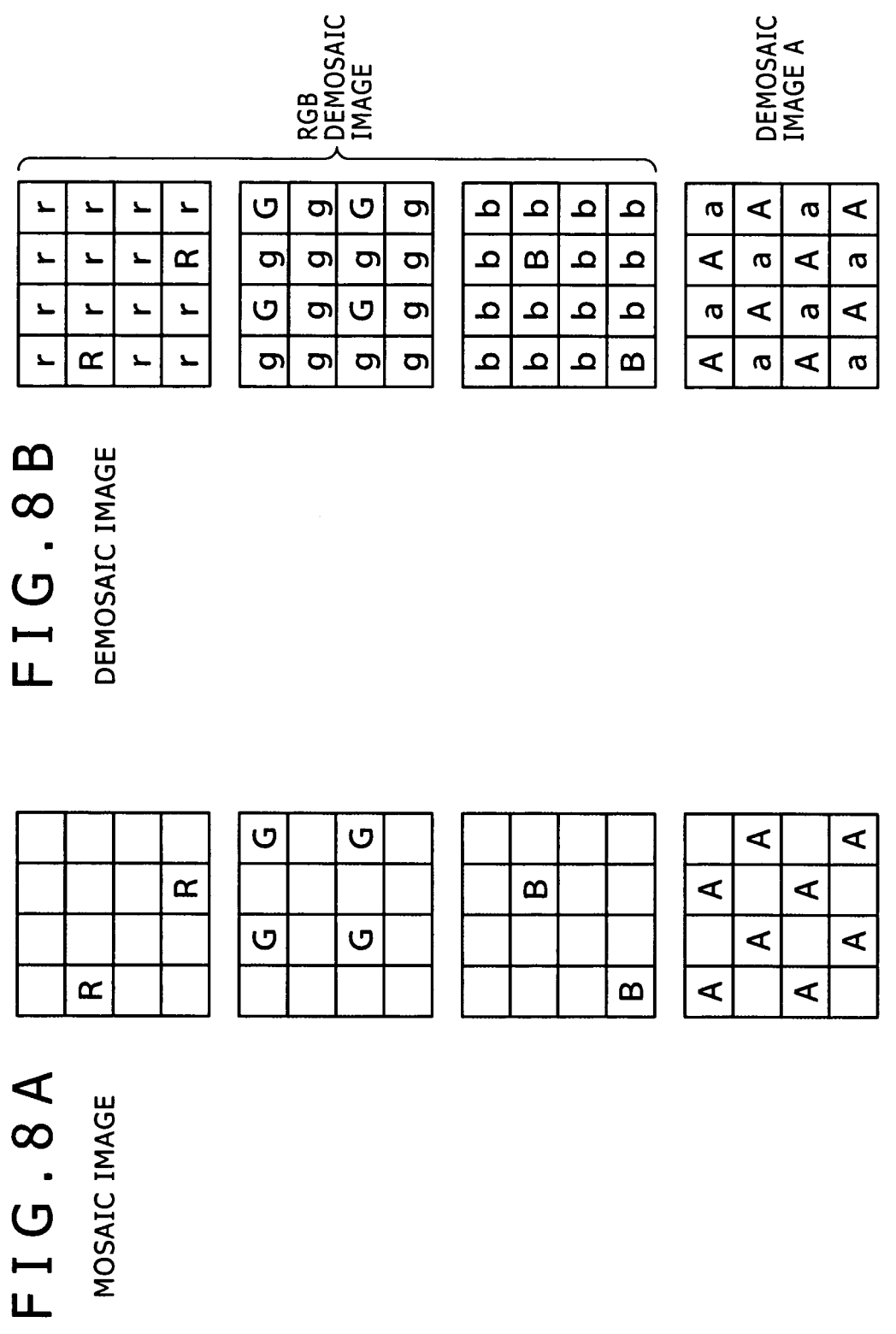

An image photographed by the imager 101 becomes a mosaic image composed of the four kinds of spectra. The mosaic image is one composed of four kinds of mosaic images composed of each channel of R, G, B and A as shown in FIG. 8A. These mosaic images are input into a white balance processing unit 102.

The white balance processing unit 102 executes white balance correcting processing for making the ranges of the pixel values included in the mosaic images having the four kinds of different spectral characteristics be almost the same. The correction of equalizing the ranges of the values of the pixels included in each of the mosaic images having different spectral characteristics from one another to be almost the same is performed to the values of the pixels constituting the mosaic images by the white balance adjusting processing, and corrected mosaic images are obtained.

The arrays of the pixels of the four mosaic images are as shown in FIG. 8A. In addition, as described above with reference to FIG. 6, the marks of R, G and B indicate the existence of the principal spectra of red, green and blue, respectively, and a pixel of A indicates a pixel the spectrum of which includes also an infrared ray (IR) component in addition to blue, green and red.

Figure 3:
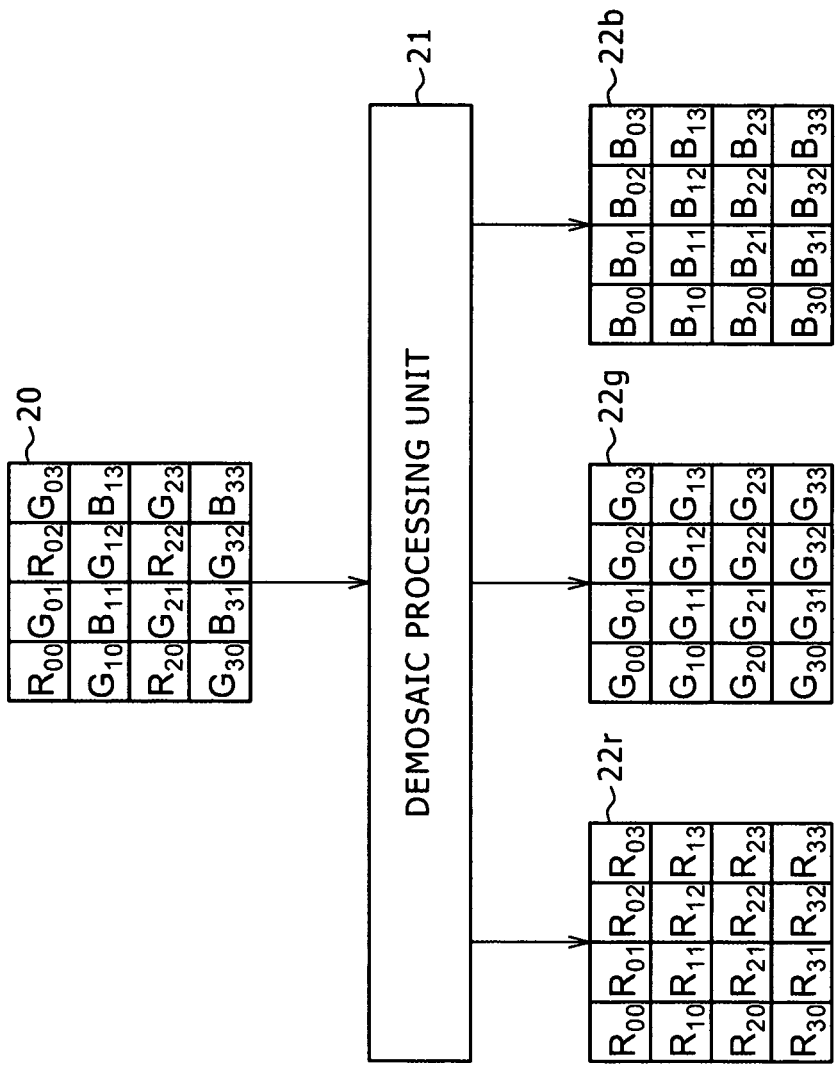
FIG. 3 is a diagram for describing demosaic processing.
Figure 4:
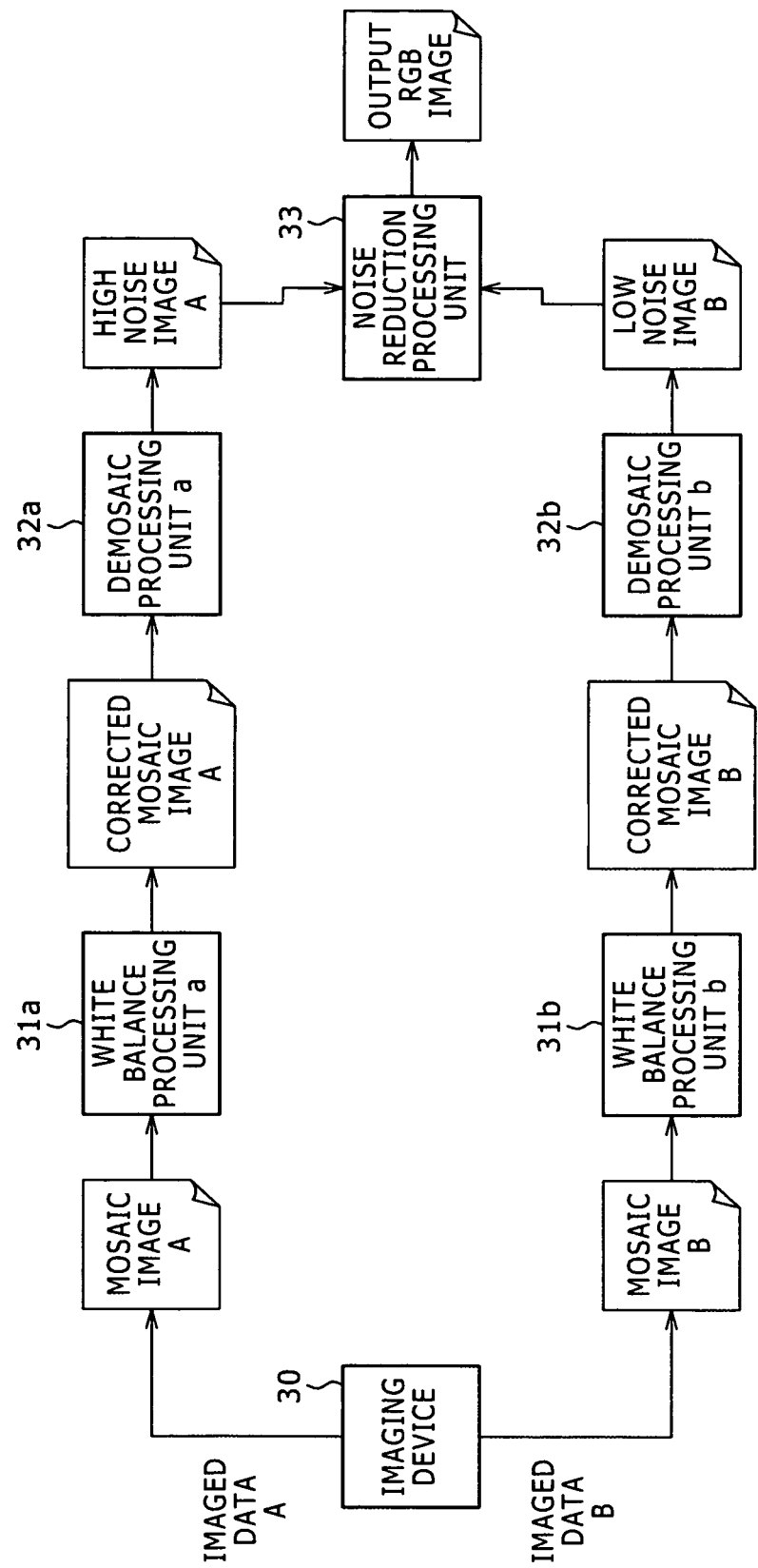
FIG. 4 is a diagram describing a signal processing example of a photographed image in a related art.

The demosaic processing of these four mosaic images is executed at a demosaic processing unit 103, subsequently, and an RGB demosaic image 111 and an A demosaic image 112 are obtained. The demosaic processing is performed by the processing of setting the pixel values of all the pixels having no pixel values by executing the interpolation based on the pixel values of the surrounding pixels, as described above with reference to FIG. 3. For example, a method similar to the well-known Vargra algorithm can be applied. The Vargra algorithm is an algorithm that performs the demosaic processing by obtaining the gradients of pixel values in eight directions to average the pixel values the gradients of which are close to one another.

By the demosaic processing in the demosaic processing unit 103, four demosaic images shown in FIG. 8B can be obtained. The upper three demosaic images correspond to the RGB demosaic image 111. The R, G and B in the four demosaic images shown in FIG. 8B denote the pixel values obtained by the mosaic images, and r, g and b denote interpolated pixel values obtained by the demosaic processing. The bottom rung of FIG. 8B shows a demosaic image A obtained from the mosaic image of the A channel transmitting all of infrared rays (IR), R, G and B. A mark A denotes a pixel value obtained from the mosaic image, and a mark a denotes an interpolated pixel value obtained by the demosaic processing.

The RGB demosaic image 111 and the A demosaic image 112 that have been obtained in such a way are input into a noise reduction processing unit 104, and noise reduction processing is executed to obtain an output RGB image.

The configuration and the processing of the noise reduction processing unit 104 are described with reference to FIG. 9. The noise reduction processing unit 104 receives the input of the two demosaic images generated on the basis of one photographed image, i.e. the RGB demosaic image 111 and the A demosaic image 112, and produces an image the noise of which has been reduced by the synthesization of these images, i.e., the output RGB image.

Figure 5:
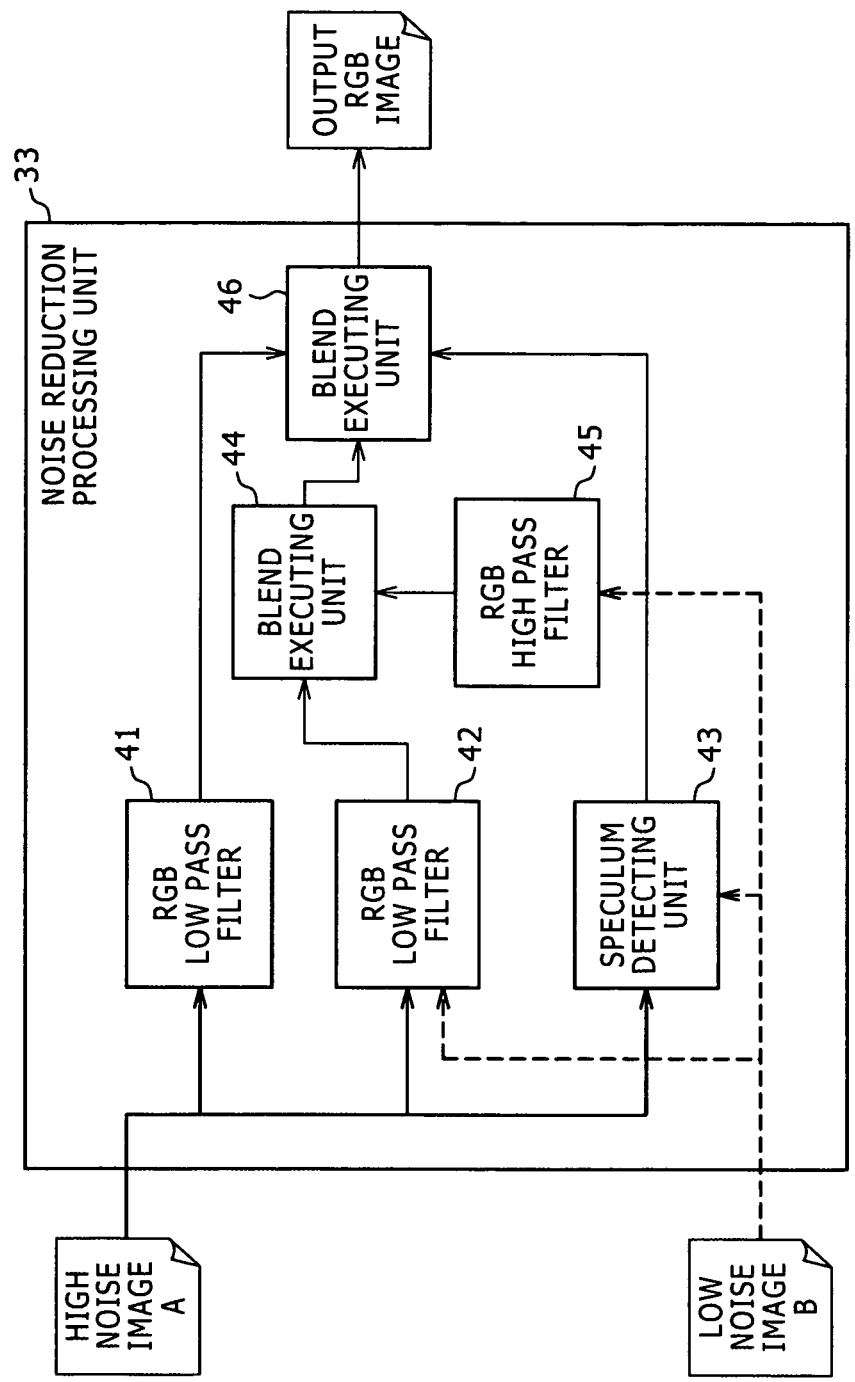
FIG. 5 is a diagram describing the signal processing example of the photographed image in the related art.
Figure 9:
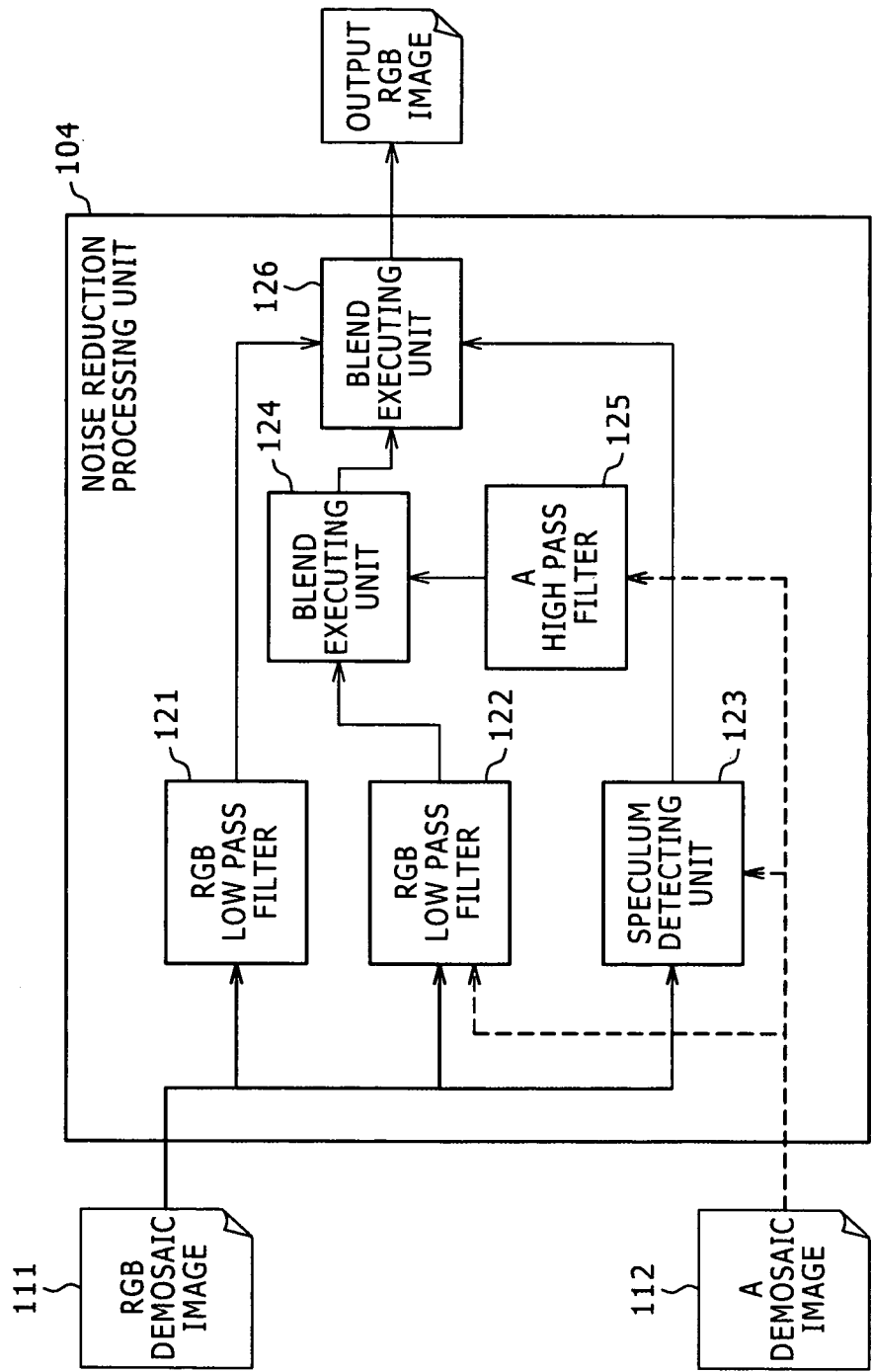
FIG. 9 is a diagram describing a configuration of a noise reduction processing unit in the image signal processing configuration (the first processing) according to the embodiment of the present invention.
Figure 10:
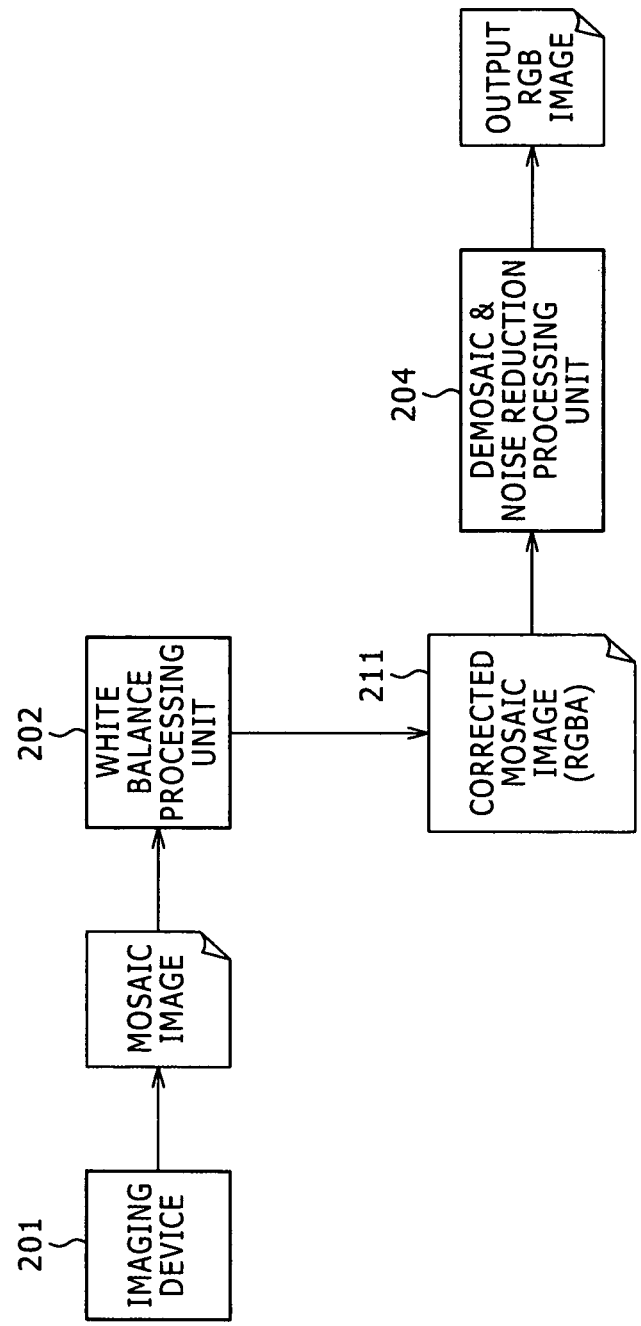
FIG. 10 is a diagram describing an image signal processing configuration (a second processing example) according to the embodiment of the present invention.

The configuration of the noise reduction processing unit 104 shown in FIG. 9 is a configuration similar to that of the noise reduction processing unit 33 described above with reference to FIG. 5. In the example of the configuration described above, the noise reduction processing has been executed on the basis of the two images photographed at different timings:

(a) a high noise image photographed with a spectral characteristic near to a target spectral characteristic, and (b) a low noise image photographed with a spectral characteristic that includes an invisible light or has a different color not to be near to the target spectral characteristic. However, in the present embodiment, an image the noise of which is reduced, i.e., the output RGB image, is generated on the basis of the images obtained by one time of photographing processing:

(a) the RGB demosaic image 111, and (b) the A demosaic image 112.

The noise reduction processing unit 104 of the present embodiment performs the processing of effectively reducing the noise included in the RGB demosaic image 111 on the basis of the A demosaic image 112 as a low noise image. An RGB low pass filter 122 is a cross bilateral filter as a kind of the edge preserving filter, and reduces the noise while preserving the edges included in the RGB demosaic image 111, which is an input image including much noise, on the basis of the edges detected from the A components of the A demosaic image 112 as an input image.

The RGB low pass filter 122 executes the correction of the pixel values of the RGB demosaic image 111 on the basis of the edge portions detected from the A components of the A demosaic image 112. Specifically, the processing of the filter 122 is a processing of correcting the pixel value of the pixel of the correction object on the basis of surrounding pixels thereof, by judging whether or not any edges exist near the pixel whose pixel value is to be corrected on the basis of the edge information detected from the A components of the A demosaic image 112, and by setting the weight of the pixel values of the pixels in the directions in which no edge portions exist large and the weight of the pixel values of the pixels in the directions in which the edge portions exist small. The reduction of the noise of the RGB demosaic image 111 can be contrived by the processing.

The RGB demosaic image 111 includes three RGB demosaic images as shown in FIG. 8B, and the noise of all of the three RGB demosaic images is reduced on the basis of the edges detected from the A components of the A demosaic image 112 while preserving the edges included in the RGB demosaic image 111.

An RGB low pass filter 121 includes general FIR low pass filters each of which is not especially equipped with the edge preserving function and is applied to each channel of R, G and B. An A-high pass filter 125 obtains the high frequency components of each of the A-pixel values of the A-demosaic image 112, which is an input image including little noise. The acquisition of the high frequency components is performed by dividing the pixel values of a result of the application of the bilateral filter to an input image by the pixel values of the image before the application of the filter.

A blend executing unit 124 generates the image data having the pixel values obtained by multiplying the pixel values of an output image of the RGB low pass filter 122 by the pixel values of an output image of the A-high pass filter 125 by applying a previously set blend function, and outputs the generated image data.

A speculum detecting unit 123 extracts the differences such as a highlight, a shadow and the like of each pixel of the two images of the RGB demosaic image 111 as the high noise image and the A-demosaic image 112 as the low noise image, and evaluates the possibility of the occurrence of the differences of the pixel values owing to the influences of the highlight, the shadow and the like. A blend executing unit 126 performs the weighted addition of an output of the RGB low pass filter 121 and an output of the blend executing unit 124 on the basis of an evaluation result of the speculum detecting unit 123 to generate the output RGB image.

The blend executing unit 126 performs the setting of enlarging the weight of the pixel values output from the RGB low pass filter 121 in the pixel portions in which the possibility of the occurrence of the highlight and the shadow is judged to be high by the speculum detecting unit 123, and of enlarging the weight of the pixel values output from the blend executing unit 124 by considering that detailed parts of a subject has appeared owing to the highlight and the shadow when the possibility is low. The blend executing unit 126 thus performs the weighted addition of the output of the RGB low pass filter 121 and the output of the blend executing unit 124 to generate the output RGB image.

According to the processing example, the two images of (a) the RGB demosaic image 111 and (b) the A demosaic image 112 are obtained by one time of photographing processing, and the reduction of noise can be performed on the basis of the obtained images. Consequently, it is possible to apply the processing example to, for example, a general digital camera and a general movie camera that can photograph an image only once at the same time, and it is possible even for such general cameras to generate and obtain a high quality image with reduced noise. That is, it is possible to obtain an RGB output image that has accurate colors and includes little noise by using an RGB demosaic image as an input image having accurate colors and much noise and by using an A-demosaic image as an input image that has not correct colors but is bright and has little noise to perform the adjustment of the RGB demosaic image on the basis of the edge data obtained from the A demosaic image.

[3. Second Image Signal Processing Example]

Next, a second image signal processing example of the present invention is described with reference to FIGS. 10-13. In the processing configuration shown in FIG. 10, the processing up to obtaining a mosaic image 211 including four mosaic images of R, G, B and A is similar to that of the first processing example described above with reference to FIG. 7. That is, an imager 201 is the imager of R, G, B and A, which has been described with reference to FIG. 6, and is composed of a filter having four kinds of spectral characteristics of R, G, B and A. The four kinds of spectra are composed of an R channel, a G channel, a B channel, and an A channel transmitting all of the infrared rays (IR), the R, the G and the B.

An image photographed by the imager 201 becomes a mosaic image composed of the four kinds of the spectra. The mosaic image includes four kinds of the mosaic images composed of each channel of R, G, B and A, as shown in FIG. 8A. These mosaic images are input into a white balance processing unit 202.

The white balance processing unit 202 executes the white balance correcting processing in order to equalize the ranges of the pixel values included in the mosaic images having the four kinds of different spectral characteristics to be almost the same. The corrections of equalizing the ranges of the pixel values included in each of the mosaic images having different spectral characteristics from one another to be almost the same by the white balance adjusting processing are performed to the values of the pixels constituting the mosaic images, and the corrected mosaic images are obtained. The arrays of the pixels of the four mosaic images are as shown in FIG. 8A.

In the present second processing example, the mosaic image (including R, G, B and A) 211 is input into a demosaic & noise reduction processing unit 204, and the demosaic & noise reduction processing unit 204 executes demosaic processing and noise reduction processing to obtain an output RGB image.

The configuration and the processing of the demosaic & noise reduction processing unit 204 are described with reference to FIG. 11. A linear demosaic filter 225 receives the input of the mosaic image A including the R, G and B and infrared ray (IR) components in the mosaic image (including R, G, B and A) 211, and performs the demosaic processing of the mosaic image A by linear interpolating processing to obtain a demosaic image of the A-channel. The A-channel demosaic image is used as a monochrome edge evaluating image 212.

Demosaic and noise reduction filters 221, 222 and 223 perform the image processing by edge preserving filters for reducing noise with the edges of an original image, which are located at the same places as those appearing in the edge evaluating image 212, being preserved to the mosaic images of R, G and B included in the mosaic image (including R, G, B and A) 211, which is an corrected mosaic image, respectively, and execute demosaic processing. The demosaic processing is performed by the processing of setting the pixel values of all the pixels by executing the interpolation based on the pixel values of the surrounding pixels to the pixels having no pixel values, as described above with reference to FIG. 3. For example, a method similar to the well-known Vargra algorithm can be applied.

The pixel value calculating processing in the demosaic and noise reduction filters 221, 222 and 223 is described. The demosaic and noise reduction filters 221, 222 and 223 generate the demosaic images that have received noise reductions of R, G and B on the basis of input R. G and B mosaic images, respectively. The processing is basically the processing of calculating a demosaic image from a mosaic image, which has been described above with reference to FIG. 8B. In the present processing example, the edge evaluating image 212, which is based on an A-channel image and is shown in FIG. 11, is applied, and noise reduction is also executed at the time of the processing.

Figure 12:
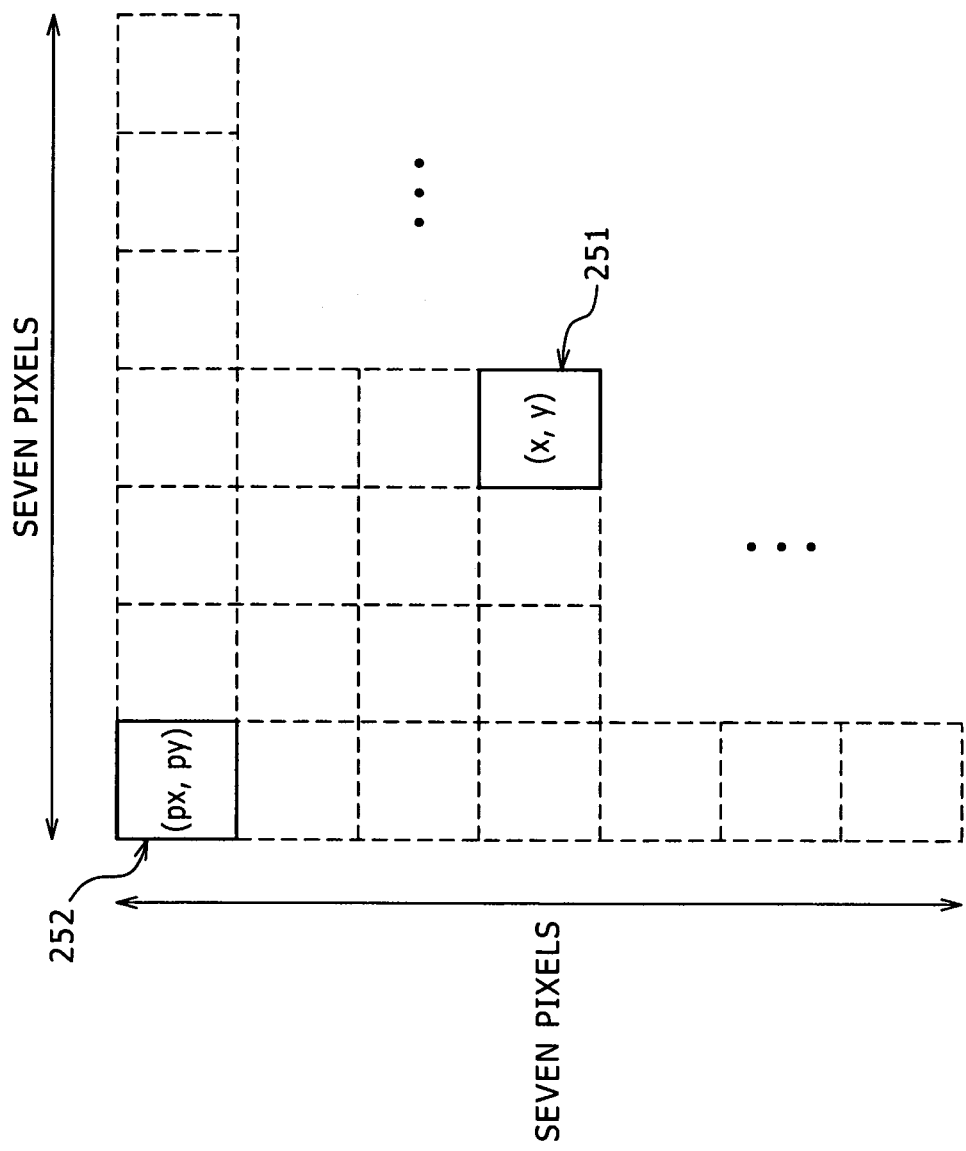
FIG. 12 is a diagram for describing the processing of a demosaic and noise reduction filter in the image signal processing configuration (the second processing example) according to the embodiment of the present invention.

The basic processing in the demosaic and noise reduction filters 221, 222 and 223 is described with reference to FIG. 12. For example, in a case where the pixel value at a pixel position (x, y) is calculated, the processing of calculating the pixel value is executed on the basis of the surrounding pixels. It is noted that the image is a mosaic image, and there are positions where pixel values exist and positions where no pixel values exist.

It is supposed that the pixel position of a surrounding pixel is denoted by (px, py), and the pixel value at the pixel position (x, y) is calculated on the basis of the pixel values at a plurality of surrounding pixels (px, py). For example, the pixel value at the pixel position (x, y) is determined on the basis of 7×7 pixels surrounding the pixel position (x, y). At the time of the pixel value determining processing, predetermined weighting is executed to the values of the surrounding pixels.

That is, the predetermined weighting is performed to the 7×7 pixels surrounding the pixel position (x, y), and the output pixel value [Out(x, y)] of the pixel position (x, y) is determined by integrating the results of multiplying the pixel values of the surrounding 7×7 pixels by the weight W in consideration of the weight W. In a general demosaic processing, the weights [W] of the surrounding pixels are set to be larger to the pixels nearer to the pixel position (x, y), and are set to be smaller to the pixels farther from the pixel position (x, y). Thereby, the so-called space-dependent weight [Ws] is set.

The present processing example of the present invention also applies the weight dependent upon the strength of edges, i.e., edge-dependent weights [Wr], collectively in consideration of the differences between the pixel value of the pixel position (x, y) and the pixel values of the surrounding pixel positions (px, py) in addition to the space-dependent weight [Ws]. The pixel value difference weight [Wr] is calculated from the edge evaluating image 212 based on the A-channel image shown in FIG. 11, and both of the demosaic processing and the noise reduction processing can be collectively executed by the processing.

The calculation of the weight [W] in consideration of the space-dependent weight Ws and the edge-dependent weight [Wr], and the calculation processing of the output pixel value [Out(x, y)] at the pixel position (x, y) are executed in conformity to the following expressions:

$$W(x, y, px, py) = W_s(x, y, px, py) \cdot W_r(x, y, px, py) \quad (1)$$

$$W_s(x, y, px, py) = \exp\left(-\frac{(x-px)^2 + (y-py)^2}{2\sigma_s^2}\right) \quad (2)$$

$$W_r(x, y, px, py) = \left[\exp\left(-\frac{(\text{Edge}(x, y) - \text{Edge}(px, py))^2}{2\sigma_r^2}\right)\right]_{if\ (In(px,py)\ exist)} \quad (3a)$$

$$W_r(x, y, px, py) = [0]_{if\ (In(px,py)\ doesn't\ exist)} \quad (3b)$$

$$\text{Out}(x, y) = \frac{\sum_{px=x-n}^{x+n} \sum_{py=y-n}^{y+n} W(x, y, px, py) \cdot \ln(px, py)}{\sum_{px=x-n}^{x+n} \sum_{py=y-n}^{y+n} W(x, y, px, py)} \quad (4)$$

In the expression (1), x and y denote the coordinates (x, y) indicating a pixel position of the output images from the demosaic and noise reduction filters 221, 222 and 223; px and py denote the coordinates (px, py) indicating a pixel position of an input image; and W denotes a weighting factor indicating the weight of the filter.

The weight [W] of the filter is calculated by a product of the space-dependent weight [Ws] dependent upon pixel coordinates and the edge-dependent weight [Wr] dependent upon the strength of an edge of the image, as shown in the expression (1).

The space-dependent weight [Ws] is expressed by the above expression (2). The edge-dependent weight [Wr] is expressed by the above expressions (3a) and (3b). In the expressions, σs denotes the standard deviation of the pixel value of a pixel having a pixel value included in an input mosaic image of any of R, G and B that is a processing object; σr is the standard deviation of the pixel value of the edge evaluating image 212, which is the A channel demosaic image obtained by the linear interpolating processing of an A mosaic image; and In (px, py) denotes the pixel value at the pixel position (px, py).

The space-dependent weight [Ws] is calculated by applying the distances between the pixel position (x, y) and the surrounding pixel positions (px, py), and the standard deviation as in accordance with the above expression (2).

On the other hand, the edge-dependent weight [Wr] is calculated by applying the pixel value Edge(x, y) at the pixel position (x, y) in the edge evaluating image 212, the pixel values Edge(px, py) at the surrounding pixel positions (px, py) and the standard deviation σr in accordance with the above expressions (3a) and (3b). It is noted that, because the processing object image is an RGB mosaic image, there are surrounding pixels in which pixel values exist [In (px, py) exists] and surrounding pixels in which no pixel values exist [In (px, py) doesn't exists].

The edge-dependent weights [Wr] at the surrounding pixel positions (px, py) in which the pixel values exist are calculated in accordance with the above expression (3a), and the edge-dependent weights [Wr] at the surrounding pixel positions (px, py) in which no pixel values exist are calculated in accordance with the above expression (3b) to be 0 regardless of the pixel values Edge(px, py).

The edge-dependent weights [Wr] dependent upon the strength of edges are the weights calculated by applying the pixel values of the edge evaluating image 212. When the differences between the pixel value Edge(x, y) at the pixel position (x, y) and the pixel values Edge(px, py) at the surrounding pixel positions (px, py) are small, the edge-dependent weights [Wr] are set to be large. When the differences are large, the edge-dependent weights [Wr] are set to be small. By setting the weights of the pixels having large differences to be small in such a way, an effect of suppressing the occurrence of noise can be obtained.

The space-dependent weight [Ws] and the edge-dependent weight [Wr] are calculated with regard to each of the surrounding pixel positions (px, py) of the pixel position (x, y) on the basis of the above expressions (2), (3a) and (3b), and an overall weight W is calculated in accordance with the above expression (1) by applying the space-dependent weight [Ws] and the edge-dependent weight [Wr]. In addition, for example, the 7×7 surrounding pixels are applied as the surrounding pixels used in the filtering processing, as described above with reference to FIG. 12.

The calculation of the output pixel value [Out(x, y)] at the pixel position (x, y) is executed in conformity to the above expression (4) after the determination of the weights [W=Ws·Wr] of the surrounding pixels. The output pixel value [Out(x, y)] at the pixel position (x, y) is a value obtained by normalizing the convolution of the weights [W] and the pixel values [In(px, py)] at the surrounding pixels in the input image by the summation of the weights. Because the weights [W] become 0 at the pixels in which the pixel values In(px, py) do not exist, the factors are calculated only to the pixels existing in the channels to which the present filters are applied, and the pixel values as the result of the multiplication by them are calculated.

As described above, because the demosaic and noise reduction filters 221, 222 and 223 are configured to calculate the output pixel value [Out(x, y)] at the pixel position (x, y) by applying the weight [W] calculated by the product of the space-dependent weight [Ws] dependent upon the pixel coordinates and the edge-dependent weight [Wr] dependent upon the strength of the edges of an image calculated in conformity with the edge evaluating image 212 generated on the basis of the A-channel image, the demosaic processing and the noise reduction processing can be performed at the same time.

Figure 11:
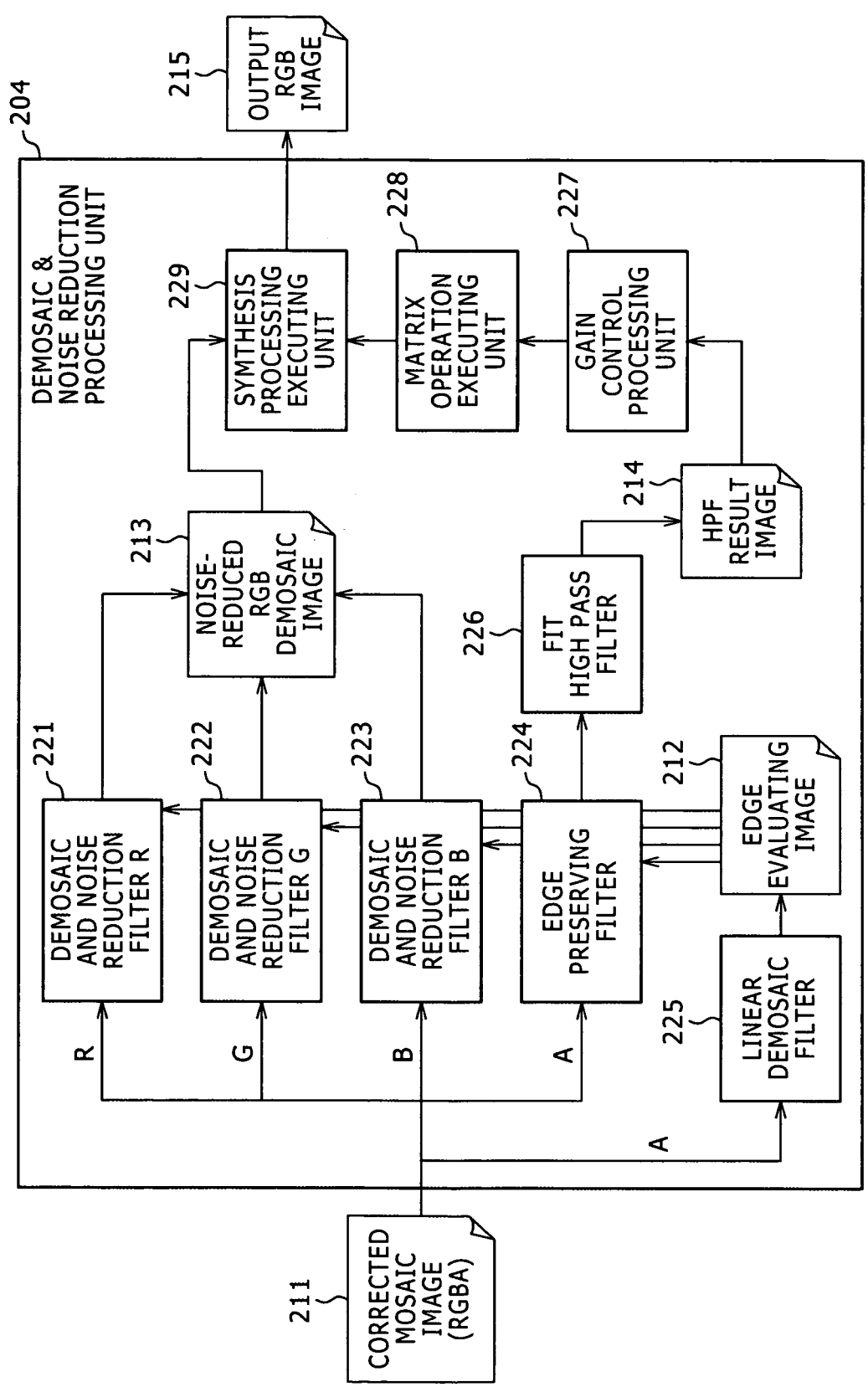
FIG. 11 is a diagram describing the configuration of a demosaic and noise reduction processing unit in the image signal processing configuration (the second processing example) according to the embodiment of the present invention.

As shown in FIG. 11, also to the A-channel mosaic image included in the corrected mosaic image 211, similarly to the RGB mosaic image, the edge preserving processing of the A-mosaic image is performed in an edge preserving filter 224 on the basis of the edges appearing in the edge evaluating image 212, which is the A-channel demosaic image. The processing applies the above expressions (1)-(4) to execute the processing of generating a noise reduced demosaic image based on the A-mosaic image.

Figure 13:
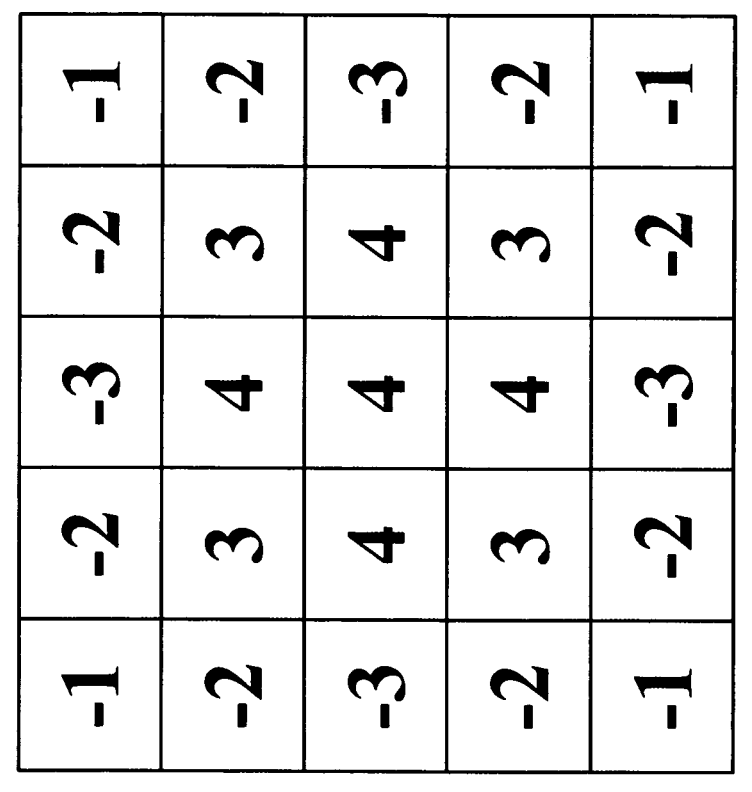

The A-channel noise-reduced demosaic image generated by the edge preserving filter 224 is input into an FIT high pass filter 226, and the extraction processing of high frequency components is executed to generate an HPF result image 214. The FIT high pass filter 226 is an FIT filter for extracting the high frequency components. An example of the factors of the FIT high pass filter 226 is shown in FIG. 13.

The HPF result image 214 is further input into a gain control processing unit 227, and the gain of the image 214 is adjusted, or amplified. Furthermore, the gain-adjusted image receives the execution of a matrix operation in a matrix operation executing unit 228, and R, G and B data included in the edge portion data in the A-channel image is extracted. Then, the extracted R, G and B data receives the addition processing with a noise-reduced RGB demosaic image 213 in a synthesis processing executing unit 229, and thereby an output RGB image 215 is generated to be output.

In addition, the data generated by the gain control and the matrix operation of the HPF result image 214 generated by the high frequency component extraction from the A-channel noise-reduced demosaic image generated by the edge preserving filter 224 is the image data applied to edge portion emphasizing processing, and the output RGB image 215, in which the edge portions are emphasized, can be obtained by adding the data with the noise-reduced RGB demosaic image 213 in the synthesis processing executing unit 229.

[4. Third Image Signal Processing Example]

Figure 14:
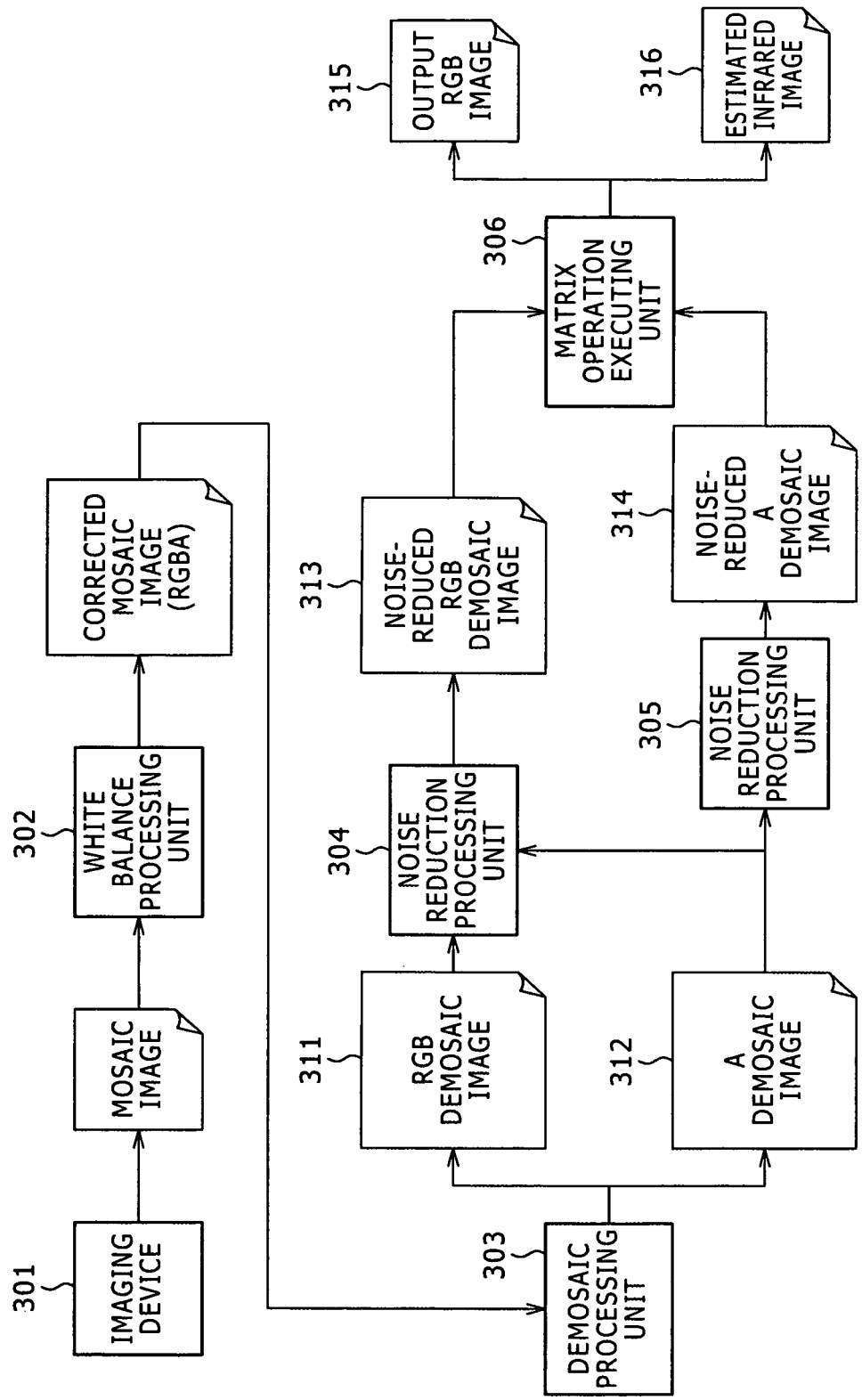
FIG. 14 is a diagram describing an image signal processing configuration (a third processing example) according to the embodiment of the present invention.

Next, a third image signal processing example of the present invention is described with reference to FIG. 14. The processing configuration shown in FIG. 14 includes the configuration for executing color space conversion processing. The processing until the acquisition of an RGB demosaic image 311 and an A-demosaic image 312 by the processing from an imager 301 to a demosaic processing unit 303 is the processing similar to the first processing example described above with reference to FIG. 7. In the present third processing example, the data after the noise reduction processing of the RGB demosaic image 311 and the A-demosaic image 312 is multiplied by a color space converting matrix in a matrix operation executing unit 306, and an output RGB image 315 and an estimated infrared (IR) image 316 are obtained.

The present processing example is now described. The imager 301 is an imager of R, G, B and A described with reference to FIG. 6, and is composed of the filter having four kinds of spectral characteristics of R, G, B and A. The four kinds of spectra are composed of an R channel, a G channel, a B channel and an A channel transmitting all of infrared rays (IR), R, G and B.

An image photographed by the imager 301 becomes a mosaic image composed of the four kinds of spectra. The mosaic image is composed of four kinds of mosaic images composed of each of the R, G, B and A channels, as shown in FIG. 8A. These mosaic images are input into a white balance processing unit 302.

The white balance processing unit 302 executes the white balance correcting processing for equalizing the ranges of the pixel values included in the mosaic images having the four kinds of different spectral characteristics to be almost the same. The correction of equalizing the ranges of the pixel values of the pixels included in each of the mosaic images having different spectral characteristics from one another to be almost the same is performed to the values of the pixels constituting the mosaic images by the white balance adjusting processing, and corrected mosaic images are obtained. The arrays of the pixels of the four mosaic images are as shown in FIG. 8A.

The demosaic processing of these four mosaic images is executed at a demosaic processing unit 303, subsequently, and the RGB demosaic image 311 and the A-demosaic image 312 are obtained. The demosaic processing is performed by the processing of setting the pixel values of all the pixels having no pixel values by executing the interpolation based on the pixel values of the surrounding pixels, as described above with reference to FIG. 3. For example, a method similar to the well-known Vargra algorithm can be applied. By the demosaic processing of the demosaic processing unit 303, four demosaic images shown in FIG. 8B can be obtained.

The RGB demosaic image 311 and the A-demosaic image 312 that have been obtained in such a way are input into noise reduction processing units 304 and 305, respectively, and noise reduction processing is executed. The noise reduction processing unit 304 is a noise reduction processing unit having a configuration as described with reference to FIG. 9 in the previous first processing example. The noise reduction processing unit 305 is a noise reduction processing unit composed of a general bilateral filter and the like. The noise reduction processing units 304 and 305 output a noise-reduced RGB demosaic image 313 and a noise-reduced A demosaic image 314 as the noise reduction processing results, respectively.

The matrix operation executing unit 306 considers the four pixel values (R, G, B and A) per pixel that can be obtained from these noise-reduced images 313 and 314 as a vector, and multiplies the four pixel values by the color space converting matrix to obtain the output RGB image 315 and the estimated IR image 316 as a result.

The converting matrix applied in the matrix operation executing unit 306 is a four-dimensional color space converting matrix evaluating the color reproducibility of the output RGB image 315 as a conversion result on the basis of the color difference with a color patch, the differences with the pixel values of R, G, B and IR of a gray patch, and the like on the assumption that the R, G and B channels include the leakage of an infrared (IR) light, and then obtaining a matrix that optimized the reproducibility as a group of numerical values. Examples of concrete converting matrices are shown in the following.

$$\begin{bmatrix} R \\ G \\ B \\ A \end{bmatrix} = \begin{bmatrix} 1.0 & 0.0 & 0.0 & 0.27 \\ 0.0 & 1.0 & 0.0 & 0.13 \\ 0.0 & 0.0 & 1.0 & 0.09 \\ 0.299 & 0.597 & 0.114 & 0.50 \end{bmatrix} \begin{bmatrix} R_{ideal} \\ G_{ideal} \\ B_{ideal} \\ IR_{ideal} \end{bmatrix} \quad (5)$$

$$\begin{bmatrix} R_{out} \\ G_{out} \\ B_{out} \\ IR_{out} \end{bmatrix} = \begin{bmatrix} 1.243603 & 0.486391 & 0.092879 & -0.81473 \\ 0.117290 & 1.234188 & 0.044719 & -0.39228 \\ 0.081201 & 0.16213 & 1.03096 & -0.27158 \\ -0.90223 & -1.80145 & -0.344 & 3.017502 \end{bmatrix} \begin{bmatrix} R_{in} \\ G_{in} \\ B_{in} \\ A_{in} \end{bmatrix} \quad (6)$$

The expression (5) is a determinant indicating the spectral characteristics of the imager to which the present processing example is applied, i.e., the spectral characteristics of each of the channels including the R, G, B and A channels shown in FIG. 6, and shows that the optical component obtained from the R channel includes 0 of G and B components and 27 of an infrared (IR) component to 100 of the ideal R component. The G channel includes 0 of the R and B components and 13 of the infrared (IR) component to 100 of the ideal G component. The B channel is composed of 0 of the R and B components and 9 of the infrared (IR) component to 100 of the ideal B component. Furthermore, the A channel is composed of 29.9 of the R component, 59.7 of the G component, 11.4 of the B component, and 50 of the infrared (IR) component.

The above expression (6) is a color space converting matrix corresponding to such an imager. Rin, Gin, Bin and Ain correspond to four pixel values (Rin, Gin, Bin, Ain) per pixel that can be obtained from the noise-reduced images 313 and 314. The matrix operation shown in the above expression (6) is executed to the pixel values (Rin, Gin, Bin, Ain) to obtain output values (Rout, Gout, Bout, Aout).

The output values (Rout, Gout, Bout) among the output values (Rout, Gout, Bout, Aout) correspond to the image composed of only the R, G and B components obtained by removing the infrared component from the noise-reduced RGB demosaic image 313 and the noise-reduced A-demosaic image 314, and the output values (Rout, Gout, Bout) are set as the output RGB image 315. Moreover, the output value Aout among the output values (Rout, Gout, Bout, Aout) corresponds to the image composed of only the infrared component that does not include the R, G and B components and has been extracted from the noise-reduced RGB demosaic image 313 and the noise-reduced A-demosaic image 314, and the output value Aout is output as the estimated IR image 316.

According to the processing example, it is possible to obtain a high quality image from which the infrared component that has passed through the RGB elements of the imager has been removed. That is, in the RGBA imager that has been described with reference to FIG. 6, the infrared (IR) components are included in the optical components that have passed through the RGB elements, but it becomes possible to obtain a high quality RGB image by analyzing the passing components of the A-channels and by applying the matrix operation to remove the IR components from the optical components that have passed through the RGB elements.

[5. Fourth Image Signal Processing Example]

Figure 15:
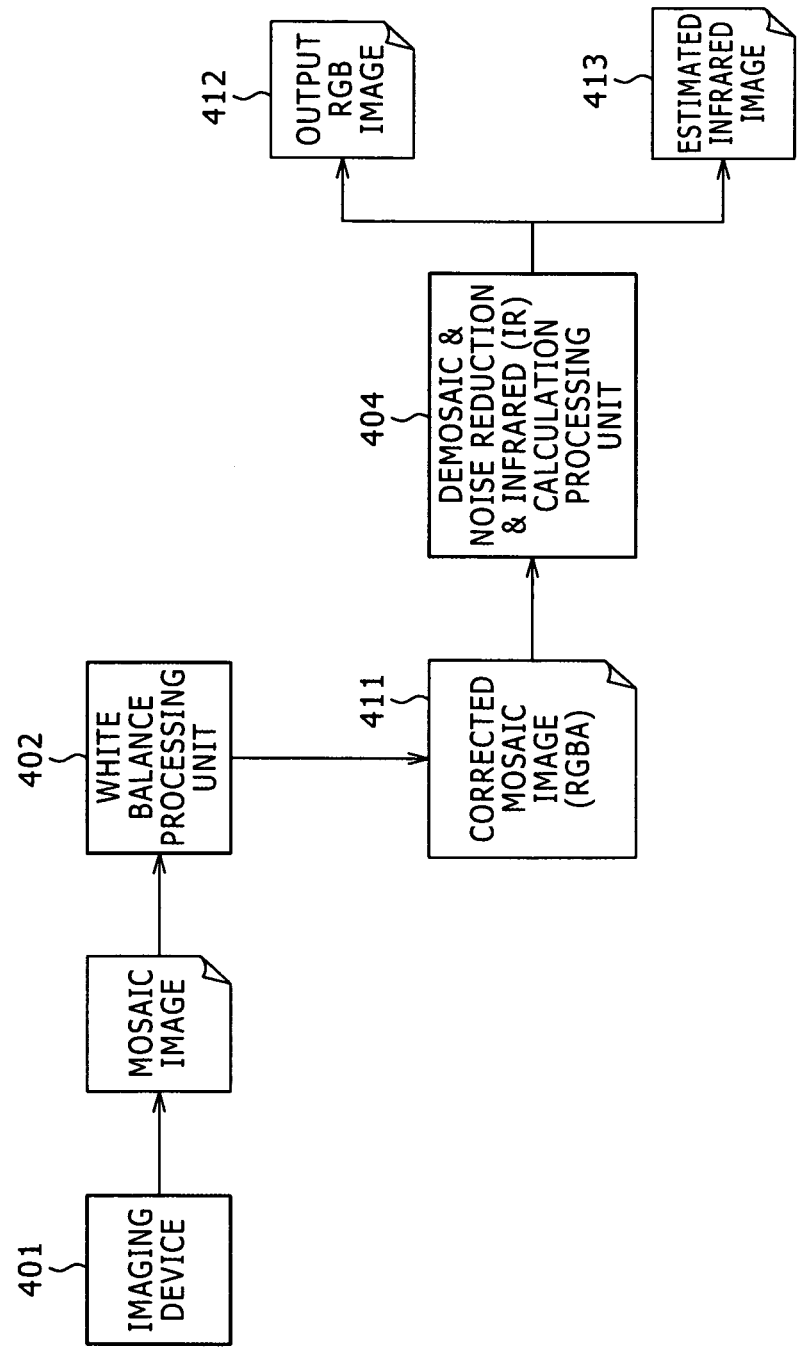
FIG. 15 is a diagram describing an image signal processing configuration (a fourth processing example) according to the embodiment of the present invention.
Figure 16:
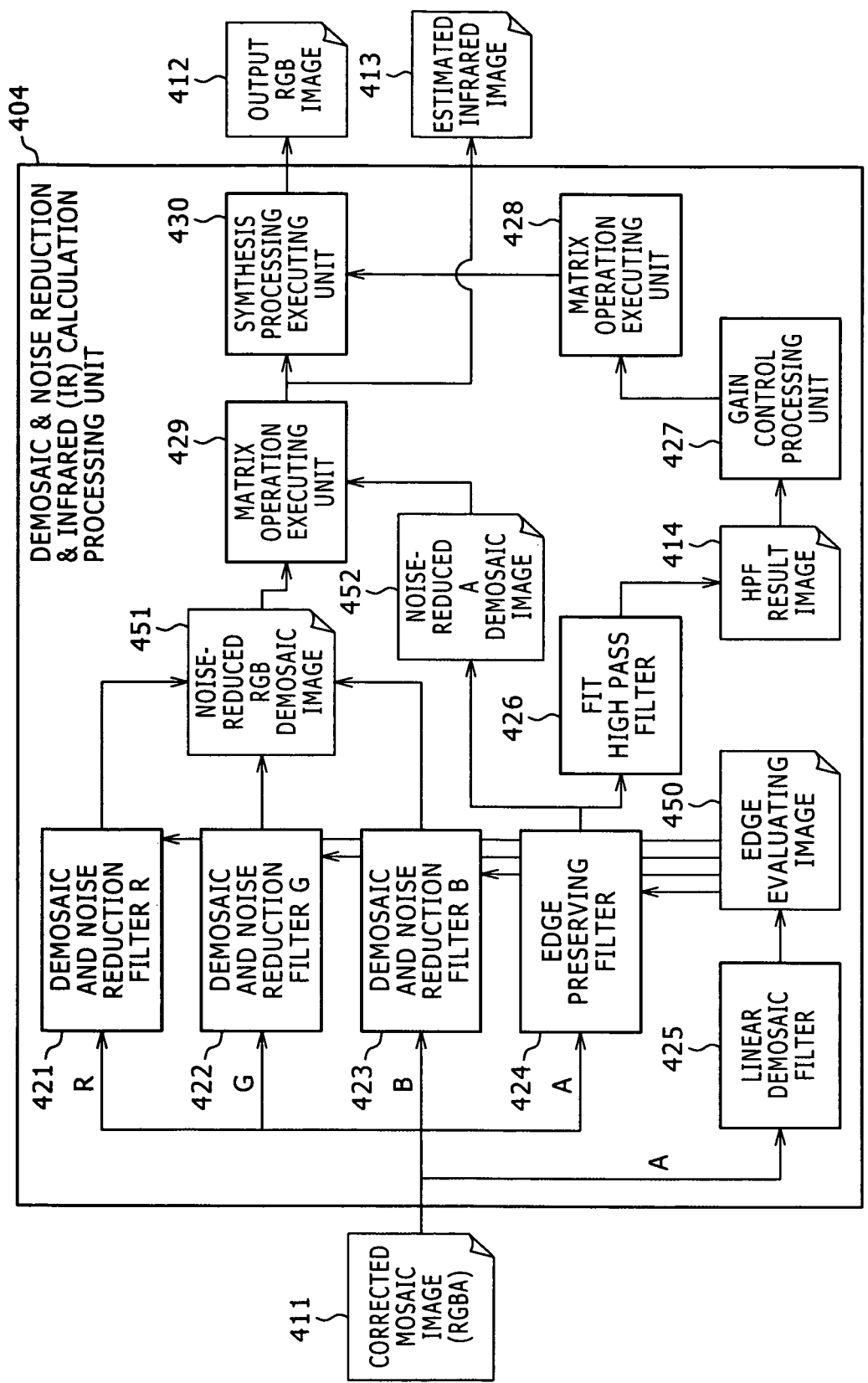
FIG. 16 is a diagram describing the configuration of a demosaic & noise reduction & infrared (IR) calculation processing unit in the image signal processing configuration (the fourth processing example) according to the embodiment of the present invention.

Next, a fourth image signal processing example of the present invention is described with reference to FIGS. 15 and 16. In the processing configuration shown in FIG. 15, the processing up to obtaining a corrected mosaic image 411 including four mosaic images of R, G, B and A is similar to that of the fourth processing example described above with reference to FIG. 14. That is, an imager 401 is the imager of R, G, B and A, which has been described with reference to FIG. 6, and is composed of a filter having four kinds of spectral characteristics of R, G, B and A. The four kinds of spectra are composed of an R channel, a G channel, a B channel and an A channel transmitting all of the infrared rays (IR), the R, the G and the B.

In the present fourth example, demosaic processing, noise reduction processing and infrared (IR) calculation processing are executed as an integrated filtering algorithm on the basis of the corrected mosaic image 411 including four mosaic images of R, G, B and A, and an output RGB image 412 and an estimated IR image 413 are obtained.

An image photographed by the imager 401 becomes a mosaic image composed of four kinds of spectra. The mosaic image is composed of the four kinds of mosaic images composed of each of the R, G, B and A channels, as shown in FIG. 8A. These mosaic images are input into a white balance processing unit 402.

The white balance processing unit 402 executes the white balance correcting processing of equalizing the ranges of the pixel values included in the mosaic images having the four kinds of different spectral characteristics to be almost the same. The correction of equalizing the ranges of the values of the pixels included in each of the mosaic images having different spectral characteristics from one another to be almost the same is performed to the values of the pixels constituting the mosaic images by the white balance adjusting processing, and corrected mosaic images are obtained. The arrays of the pixels of the four mosaic images are as shown in FIG. 8A.

Next, a demosaic & noise reduction & IR calculation processing unit 404 executes the demosaic processing, the noise reduction processing and the infrared (IR) calculation processing of these four mosaic images as the integrated filtering algorithm on the basis of the corrected mosaic image 411 including the four mosaic images of R, G, B and A, and outputs the output RGB image 412 and the estimated IR image 413.

The configuration and the processing of the demosaic & noise reduction & IR calculation processing unit 404 are described with reference to FIG. 16. The configuration shown in FIG. 16 is similar to that of the demosaic & noise reduction processing unit 204, which has been described above with reference to FIG. 11 in the second processing example. Difference from the configuration of the demosaic & noise reduction processing unit 204 is that a matrix operation executing unit 429 is added. The demosaic & noise reduction & IR calculation processing unit 404 is configured to separate and output the output RGB image 412 and the estimated IR image 413 by a matrix operation in the matrix operation executing unit 429.

Demosaic and noise reduction filters 421, 422 and 423 perform the image processing by the edge preserving filters for reducing noise while preserving the edges to the mosaic images of R, G and B included in the mosaic image (including R, G, B and A) 411, which is an corrected mosaic image, respectively, and execute demosaic processing to obtain a noise-reduced RGB demosaic image 451, similarly to the second processing example, which has been described above with reference to FIG. 11.

For the noise reduction processing, an edge evaluating image 450 generated by the processing in a linear demosaic filter 425 is applied to the A-mosaic image, and thereby the image processing by the edge preserving filter for reducing noise with the edges of an original image that are located at the same positions where the edges appearing in the edge evaluating image 450 being preserved is performed. The processing is the processing that has been described above with reference to FIG. 12, and is the processing in which the above expressions (1) to (4) are applied, namely the processing of calculating the output pixel value [Out(x, y)] at the pixel position (x, y) by applying the weight [W] calculated by the product of the space-dependent weight [Ws] dependent upon the pixel coordinates and the edge-dependent weight [Wr] dependent upon the strength of the edges of an image calculated in conformity to the edge evaluating image 450 generated on the basis of the A-channel image. By the processing, demosaic processing and noise reduction processing can be performed at the same time.

Similarly to the second processing example, the edge preserving processing of the A-mosaic image is performed in an edge preserving filter 424 also to the A channel mosaic image included in the corrected mosaic image 411 similarly to the RGB mosaic image on the basis of the edges appearing in the edge evaluating image 450, which is the A-channel demosaic image. The processing also applies the above expressions (1)-(4) to be executed as the processing of generating a noise-reduced A-demosaic image 452 based on the A-mosaic image.

The noise-reduced A-demosaic image 452 generated by the edge preserving filter 424 is input into an FIT high pass filter 426, and the extraction processing of high frequency components is executed to generate an HPF result image 414. The FIT high pass filter 426 is an FIT filter for extracting the high frequency components, and has the factors described above with reference to FIG. 13, for example.

The HPF result image 414 is further input into a gain control processing unit 427, and the gain of the image 414 is adjusted, or amplified. Furthermore, the gain-adjusted image receives the execution of a matrix operation in a matrix operation executing unit 428, and R, G and B data included in the edge portion data in the A-channel image is extracted to be output to a synthesis processing executing unit 430.

Furthermore, in the present fourth processing example, the noise-reduced A-demosaic image 452 corresponding to the A-channel generated in the edge preserving filter 424 and the noise-reduced RGB demosaic image 451 generated by the processing of the demosaic and noise reduction filters 421, 422 and 423 are input into the matrix operation executing unit 429, and a matrix operation based on the input information is executed.

The matrix operation in the matrix operation executing unit 429 is a processing similar to the processing in the matrix operation executing unit 306, which processing has been described with reference to FIG. 14 in the third processing example. The matrix operation executing unit 429 regards four pixel values (R, G, B and A) per pixel as a vector, which four pixel values are obtained from the noise-reduced A-demosaic image 452 generated in the edge preserving filter 424 and the noise-reduced RGB demosaic image 451, and multiplies the four pixel values by the color space converting matrix. As a result, the matrix operation executing unit 429 obtains an RGB image to be input into the synthesis processing executing unit 430 and the estimated IR image 413, and outputs the images.

The converting matrix applied in the matrix operation executing unit 429 is a four-dimensional color space converting matrix evaluating the color reproducibility of the RGB image as a conversion result on the basis of the color difference with a color patch, the differences with the pixel values of R, G, B and IR of a gray patch, and the like on the assumption that the R, G and B channels include the leakage of an IR light, and then obtaining a matrix that makes the reproducibility the best as numeral values. As a concrete converting matrix, for example, the expression (6) described above in the third processing example is applied.

The matrix operation executing unit 429 executes the matrix operation expressed by the expression (6) described above to obtain output values (Rout, Gout, Bout and Aout). The output values (Rout, Gout and Bout) among the output values (Rout, Gout, Bout and Aout) correspond to the image composed of only the R, G and B components generated by removing the IR components from the noise-reduced RGB demosaic image 451 and the noise-reduced A-demosaic image 452, and the output values (Rout, Gout and Bout) are set to the RGB image to be input into the synthesis processing executing unit 430.

Moreover, the output value (Aout) among the output values (Rout, Gout, Bout and Aout) corresponds to the image that has been generated from the noise-reduced RGB demosaic image 451 and the noise-reduced A-demosaic image 452 and does not include the R, G and B components and is composed of only the IR component, and the output value (Aout) is output as the estimated IR image 413.

The synthesis processing executing unit 430 executes the addition processing of the image that has been generated by removing the IR components generated by the matrix operation of the matrix operation executing unit 429 to be composed of only the R, G and B components, and the extracted data of the R, G and B data included in the edge portion data generated on the basis of the A-channel image in the matrix operation executing unit 428 to generate and output the output RGB image 412. In the synthesis processing executing unit 430, the output RGB image 412 whose edge portions are emphasized can be obtained.

In the above, the present invention has been described in detail, referring to the specific embodiment. However, it is apparent that the skilled person in the art can perform modifications and the substitutions of the embodiment without departing from the spirit of the present invention. That is, the present invention has been disclosed in the form of an illustration, and the present invention should not be interpreted to be limited to the embodiment. In order to judge the scope of the present invention, the claims should be taken into consideration.

Moreover, a series of processing described in the present specification can be executed by hardware, software or a compound configuration of both of them. In the case of executing the processing by software, a program recording a processing sequence can be installed in a memory in a computer built in exclusive hardware to be executed, or the program can be installed in a general purpose computer capable executing various kinds of processing to be executed.

For example, the program can be recorded in advance into a hard disk or a read only memory (ROM) as a recording medium. Alternatively, the program can be temporarily or eternally stored (recorded) into a removable recording medium such as a flexible disk, a compact disc read only memory (CD-ROM), a magneto optical (MO) disk, a digital versatile disc (DVD), a magnetic disc, a semiconductor memory or the like. Such a removable recording medium can be provided as the so-called package software.

In addition, the program can be wirelessly transferred to a computer from a download site, or can be transferred to a computer by wire through a network such as a local area network (LAN), the Internet or the like, in addition to the installation into a computer from the removable recording medium mentioned above, and the computer can receive the program transferred in the way mentioned above to install the received program into a recording medium such as a hard disk built in the computer.

In addition, the various kinds of processing described in the present specification are not only sequentially executed in conformity to the descriptions, but also can be executed in parallel or severally according to the throughput of an apparatus executing the processing or on occasion. Moreover, the system in the present specification indicates the logical set configuration of a plurality of apparatus, and the system is not limited to one in which the apparatus of each configuration is in the same housing.

As described above, according to the configuration of the present invention, the demosaic image of each of the obtained signals is generated based on the mosaic image data of each of the signals obtained by a single plate imager including an element array composed of the visible light obtaining elements obtaining the visible light signals such as R, G and B signals and the invisible light obtaining elements obtaining the signals including the invisible light components including infrared rays and the like, and the correction of the pixel values of the demosaic image obtained by the visible light obtaining elements is executed based on the edge information extracted from the demosaic image of the signals obtained by the invisible light obtaining elements. Thereby, the high quality image data including reduced noise can be obtained based on an image obtained by one time of photographing processing.

It should be understood by those skilled in the art that various modifications, combinations, sub-combinations and alterations may occur depending on design requirements and other factors insofar as they are within the scope of the appended claims or the equivalents thereof.

CROSS REFERENCES TO RELATED APPLICATIONS

The present document contains subject matter related to Japanese Patent Application JP 2005-369378 filed in the Japanese Patent Office on Dec. 22, 2005, the entire contents of which being incorporated herein by reference.

What is claimed is:

1. An image signal processing apparatus, comprising:
a demosaic processing unit receiving input of mosaic image data based on signals obtained by an imaging device having an element array including a first element and a second element, the first element being a visible light obtaining element, and the second element being an invisible light obtaining element, wherein the demosaic processing unit generates a first demosaic image corresponding to a first subset of the signals obtained by the visible light obtaining element, and generates a second demosaic image corresponding to a second subset of the signals obtained by the invisible light obtaining element, and wherein the first and second subsets of the signals are obtained simultaneously during capturing of an image;
a noise reduction processing unit that:
receives the first demosaic image and the second demosaic image;
extracts edge information from the second demosaic image;
sets weights for pixel values of the first demosaic image based on the edge information; and
corrects pixel values of the first demosaic image based on the set weights;
a filter unit generating processed pixel values based on the pixel values of the first demosaic image;
a speculum detecting unit outputting an evaluation result based on a difference in the pixel values of the first demosaic image and a difference in pixel values of the second demosaic image, the differences being caused due to an illumination change;
a first blend execution unit generating output image data based on the evaluation result and a multiplication of the corrected pixel values with filtered pixel values based on the pixel values of the second demosaic image; and a second blend execution unit generating visible output image data based on the evaluation result, wherein the visible output image is generated by enlarging one of the processed pixel values when the evaluation result is of a first type, and wherein the visible output image is generated by enlarging a pixel value included in the output image data when the evaluation result is of a second type different from the first type.

2. The image signal processing apparatus according to claim 1, wherein the visible light obtaining element includes RGB elements obtaining R, G, and B color signals to generate the first demosaic image, and the invisible light obtaining element includes A elements obtaining an A signal including R, G, B, and infrared components to generate the second demosaic image, such that the pixel values of the first demosaic image are corrected based on the A signal.

3. The image signal processing apparatus according to claim 2, wherein the pixel values of the first demosaic image are corrected by using edge distribution on surrounding pixel values.

4. The image signal processing apparatus according to claim 2, wherein the demosaic processing unit is configured to generate an edge evaluating image as the second demosaic image corresponding to the A signal, and the noise reduction processing unit is configured to execute demosaic processing on mosaic images corresponding to the first demosaic image R, G, and B color signals by executing noise reduction on the basis of the edge evaluating image.

5. The image signal processing apparatus according to claim 4, wherein the noise reduction processing unit is configured to calculate an output pixel value of each pixel position in the mosaic images on the basis of the surrounding pixel values by calculating a product of space-dependent weight dependent upon a distance between a pixel of a correction object and a reference pixel, and edge-dependent weight dependent upon strength of an edge of an image calculated in conformity to the edge evaluating image.

6. The image signal processing apparatus according to claim 2, further comprising:
an A-noise reduction processing unit generating a noise-reduced A-demosaic image corresponding to the A signal on the basis of the edge information extracted from the second demosaic image; and
a matrix operation executing unit receiving input of a noise-reduced RGB-demosaic image generated by the noise reduction processing unit and the noise-reduced A-demosaic image, and converting pixel values by a matrix operation to generate an RGB image by removing the infrared components.

7. The image signal processing apparatus according to claim 6, wherein the matrix operation executing unit is configured to generate and output an estimated infrared image composed of infrared components on the basis of the noise-reduced RGB-demosaic image and the noise-reduced A-demosaic image.

8. An imaging apparatus, comprising:
an imaging device having a color array composed of RGB elements and A elements, the RGB elements being visible light obtaining elements, and the A elements being invisible light obtaining elements, wherein the color array obtains R, G, and B color signals and A signals simultaneously during capturing of an image;
a demosaic processing unit generating a first demosaic image based on the R, G, and B color signals obtained by the RGB elements, and generating a second demosaic image based on the A signals obtained by the A elements; and
a noise reduction processing unit that:
receives the first demosaic image and the second demosaic image;
extracts edge information from the second demosaic image;
sets weights for pixel values of the first demosaic image based on the edge information; and
corrects pixel values of the first demosaic image based on the set weights;
a filter unit generating processed pixel values based on the pixel values of the first demosaic image;
a speculum detecting unit outputting an evaluation result based on a difference in the pixel values of the first demosaic image and a difference in pixel values of the second demosaic image, the differences being caused due to an illumination change;
a first blend execution unit generating output image data based on the evaluation result and a multiplication of the corrected pixel values with filtered pixel values based on the pixel values of the second demosaic image; and
a second blend execution unit generating visible output image data based on the evaluation result,
wherein the visible output image is generated by enlarging one of the processed pixel values when the evaluation result is of a first type, and
wherein the visible output image is generated by enlarging a pixel value included in the output image data when the evaluation result is of a second type different from the first type.

9. The imaging apparatus according to claim 8, wherein the A elements are arranged in a checkered-pattern.

10. An image signal processing method being executed by a processing device, comprising:
receiving, by the processing device, input of mosaic image data based on signals obtained by an imaging device having an element array including a first element and a second element, the first element being a visible light obtaining element, and the second element being an invisible light obtaining element;
generating a first demosaic image corresponding to a first subset of the signals obtained by visible light obtaining element;
generating a second demosaic image corresponding to a second subset of the signals obtained the invisible light obtaining element, wherein the first and second subsets of the signals are obtained simultaneously during capturing of an image;
extracting edge information from the second demosaic image;
setting weights for pixel values of the first demosaic image based on the edge information;
correcting pixel values of the first demosaic image based on the set weights;
generating processed pixel values based on the pixel values of the first demosaic image;
outputting, by using a speculum detecting unit, an evaluation result based on a difference in the pixel values of the first demosaic image and a difference in pixel values of the second demosaic image, the differences being caused due to an illumination change;
generating output image data based on the evaluation result and a multiplication of the corrected pixel values with filtered pixel values based on the pixel values of the second demosaic image; and generating visible output image data based on the evaluation result, wherein the visible output image is generated by enlarging one of the processed pixel values when the evaluation result is of a first type, and wherein the visible output image is generated by enlarging a pixel value included in the output image data when the evaluation result is of a second type different from the first type.

11. The image signal processing method according to claim 10, wherein the visible light obtaining element includes RGB elements obtaining R, G, and B color signals to generate the first demosaic image, and the invisible light obtaining includes A elements obtaining an A signal including R, G, B, and infrared components to generate the second demosaic image such that the pixel values of the first demosaic image are corrected based on the edge information extracted from the second demosaic image corresponding to the A signal.

12. The image signal processing method according to claim 11, wherein the pixel values of the first demosaic image are corrected by using edge distribution on surrounding pixel values.

13. The image signal processing method according to claim 11, further comprising:
generating an edge evaluating image as the second demosaic image corresponding to the A signal; and
executing demosaic processing on mosaic images corresponding to the first demosaic image R, G, and B signals by executing noise reduction on the basis of the edge evaluating image.

14. The image signal processing method according to claim 11, further comprising:
calculating an output pixel value of each pixel position in the mosaic images on the basis of the surrounding pixel values by calculating a product of space-dependent weight dependent upon a distance between a pixel of a correction object and a reference pixel, and edge-dependent weight dependent upon strength of an edge of an image calculated in conformity to the edge evaluating image.

15. The image signal processing method according to claim 11, further comprising:
generating a noise-reduced A-demosaic image corresponding to the A signal on the basis of the edge information extracted from the second demosaic image;
receiving input of a noise-reduced RGB demosaic image and the noise-reduced A-demosaic image; and
converting pixel values by a matrix operation to generate an RGB image by removing the infrared components.

16. The image signal processing method according to claim 15, further comprising:
outputting an estimated infrared image composed of the infrared components on the basis of the noise-reduced RGB-demosaic image and the noise-reduced A-demosaic image.

17. A non-transitory computer-readable storage medium storing a computer program that, when executed on a processor of an imaging apparatus, causes the processor to perform a method for image signal processing, the method comprising:
receiving input of mosaic image data based on signals obtained by an imaging device having an element array including a first element and a second element, the first element being a visible light obtaining element;
generating a first demosaic image corresponding to a first subset of the signals obtained by the obtained visible light obtaining element;
generating a second demosaic image corresponding to a second subset of the signals obtained the invisible light obtaining element, wherein the first and second subsets of the signals are obtained simultaneously during capturing of an image;
extracting edge information from the second demosaic image;
setting weights for pixel values of the first demosaic image based on the edge information;
correcting pixel values of the first demosaic image based on the set weights;
generating processed pixel values based on the pixel values of the first demosaic image;
outputting an evaluation result based on a difference in the pixel values of the first demosaic image and a difference in pixel values of the second demosaic image, the differences being caused due to an illumination change;
generating output image data based on the evaluation result and a multiplication of the corrected pixel values with filtered pixel values based on the pixel values of the second demosaic image; and
generating visible output image data based on the evaluation result, wherein the visible output image is generated by enlarging one of the processed pixel values when the evaluation result is of a first type, and wherein the visible output image is generated by enlarging a pixel value included in the output image data when the evaluation result is of a second type different from the first type.

* * * * *